United States Patent
Tagami et al.

(10) Patent No.: US 9,849,773 B2
(45) Date of Patent: Dec. 26, 2017

(54) GENERATION CONTROL APPARATUS

(71) Applicant: HONDA MOTOR CO., LTD., Tokyo (JP)

(72) Inventors: Hiroshi Tagami, Wako (JP); Toru Nakasako, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/915,025

(22) PCT Filed: May 15, 2014

(86) PCT No.: PCT/JP2014/062986
§ 371 (c)(1),
(2) Date: Feb. 26, 2016

(87) PCT Pub. No.: WO2015/029507
PCT Pub. Date: Mar. 5, 2015

(65) Prior Publication Data
US 2016/0200314 A1    Jul. 14, 2016

(30) Foreign Application Priority Data

Aug. 29, 2013  (JP) .................................. 2013-178273
Aug. 29, 2013  (JP) .................................. 2013-178274

(51) Int. Cl.
*B60K 6/46*     (2007.10)
*B60W 20/00*    (2016.01)
*B60W 10/06*    (2006.01)
*B60W 10/08*    (2006.01)
(Continued)

(52) U.S. Cl.
CPC ............... *B60K 6/46* (2013.01); *B60L 11/12* (2013.01); *B60W 10/06* (2013.01); *B60W 10/08* (2013.01); *B60W 10/26* (2013.01); *B60W 20/00* (2013.01); *B60W 20/12* (2016.01); *B60W 20/13* (2016.01);
(Continued)

(58) Field of Classification Search
CPC .............. B60W 10/06; B60Y 2400/114; Y02T 10/6217
USPC .......................................................... 701/22
See application file for complete search history.

(56) References Cited

U.S. PATENT DOCUMENTS 6,137,250 A * 10/2000 Hirano ..................... B60K 6/46
                                                    180/65.245
6,429,613 B2 * 8/2002 Yanase ..................... B60K 6/46
                                                    180/65.1
(Continued)

FOREIGN PATENT DOCUMENTS

CN        102431547 A       5/2012
JP        2001-238304 A     8/2001
(Continued)

OTHER PUBLICATIONS

International Search Report dated Jul. 29, 2014, issued in counterpart Application No. PCT/JP2014/062986 (2 pages).
(Continued)

*Primary Examiner* — Tyler J Lee
(74) *Attorney, Agent, or Firm* — Westerman, Hattori, Daniels & Adrian, LLP

(57) ABSTRACT

A hybrid vehicle includes a battery, a generating unit having an internal combustion engine and a generator which generates electric power by operating the internal combustion engine to supply the generated electric power to a motor or the battery, and the motor which is driven by the electric power supplied from at least one of the battery and the generating unit. A generation control apparatus for the hybrid vehicle evaluates the driving condition of the vehicle from viewpoints of the energy consumption at the motor, the NV performance of the vehicle and the generation efficiency of the generating unit and determines whether or not the operation of the generating unit is necessary based on an evaluation parameter of any one or more viewpoints.

19 Claims, 20 Drawing Sheets

(51) Int. Cl.
  *B60W 20/12* (2016.01)
  *B60W 20/13* (2016.01)
  *B60L 11/12* (2006.01)
  *B60W 10/26* (2006.01)
  *B60W 20/17* (2016.01)

(52) U.S. Cl.
  CPC ....... *B60W 20/17* (2016.01); *B60W 2510/244* (2013.01); *B60W 2530/00* (2013.01); *B60W 2710/06* (2013.01); *B60W 2710/08* (2013.01); *B60Y 2400/114* (2013.01); *B60Y 2400/214* (2013.01); *Y02T 10/6217* (2013.01); *Y02T 10/6286* (2013.01); *Y10S 903/93* (2013.01)

(56) References Cited

U.S. PATENT DOCUMENTS

| | | | |
|---|---|---|---|
| 8,342,272 B2 * | 1/2013 | Gee | B60K 6/445 |
| | | | 180/65.265 |
| 8,948,948 B2 | 2/2015 | Tagami | |
| 2001/0020833 A1 | 9/2001 | Yanase et al. | |
| 2012/0158230 A1 * | 6/2012 | Nicholls | B60K 6/46 |
| | | | 701/22 |
| 2013/0274982 A1 | 10/2013 | Tagami | |
| 2013/0293007 A1 | 11/2013 | Tagami | |

FOREIGN PATENT DOCUMENTS

| | | |
|---|---|---|
| JP | 2005-295617 A | 10/2005 |
| JP | 2006-94628 A | 4/2006 |
| JP | 2009-154715 A | 7/2009 |
| JP | 2013-103563 A | 5/2013 |
| WO | 2012/090688 A1 | 7/2012 |
| WO | 2012/090689 A1 | 7/2012 |

OTHER PUBLICATIONS

Office Action dated May 4, 2017, issued in counterpart Chinese Application No. 201480047062.6 (4 pages).

* cited by examiner

GENERATION CONTROL APPARATUS

TECHNICAL FIELD

The present invention relates to a generation control apparatus for a hybrid vehicle.

BACKGROUND ART

A series HEV (Hybrid Electrical Vehicle) includes a motor, a generator and an internal combustion engine and is driven by means of a driving force of the motor. The internal combustion engine is used to generate electrical power. The electrical power generated in the generator by means of the power of the internal combustion engine is used to charge a battery or is supplied to the motor. In the following description, the internal combustion engine and the generator 111 will collectively be referred to as an "auxiliary power unit (APU) 121.

The series HEV executes an "EV driving" or a "series driving." In an EV driving mode, the HEV is driven by means of a driving force of the motor which is driven by means of electric power which is supplied from a battery. As this occurs, the internal combustion engine is not driven. In a series driving mode, the HEV is driven by means of a driving force of the motor which is driven by means of electric power supplied from both the battery and the APU or electric power supplied only from the APU. As this occurs, the internal combustion engine is driven to drive the generator to generate electric power.

In a plug-in HEV (PHEV), a driving using a CD (Charge Depleting) mode or a driving using a CS (Charge Sustaining) mode is executed. In the CD mode, a motor is driven only by electric power supplied from a battery which is mainly charged by an external or off board commercial power supply, and the SOC (State of Charge) of the battery is lowered according to driving of the motor or the like. In the CS mode, generated electric power obtained from the generator which is mainly driven by an internal combustion engine is used to drive the motor auditor to charge the battery, and the SOC of the battery is maintained substantially constant. Even in the CD mode, the internal combustion engine can be driven according to a required output which is derived from a vehicle speed and an accelerator pedal position and the SOC of the battery. Even in the CS mode, the driving of the internal combustion engine can be stopped according to a required output and the SOC of the battery.

FIG. 19 shows graphs showing an example of changes with time of consumed energy, SOC of the battery, generated electric power by the generator and vehicle speed as the PHEV is driven. In the graph of the consumed energy in FIG. 19, bars which are not hatched indicate energy based on electric power supplied from the battery, and bars which are hatched indicate energy based on electric power supplied from the APU. Portions of the consumed energy indicated by negative values indicate a portion of the power supplied power from APU, which is charged to the battery.

In the example shown in FIG. 19, the CD mode is selected when the PHEV starts from rest, and the PHEV is driven by driving the motor only by electric power supplied from the battery which is charged to a sufficient level. Thereafter, energy is consumed according to the driving of the PHEV, and the SOC of the battery is lowered. The driving mode of the PHEV is switched to the CS mode when the SOC of the battery is lowered to a threshold th, and the internal combustion engine is started. Thereafter, although the SOC of the battery is lowered below the threshold the as a result of the energy being consumed in the motor by the driving of the PHEV, the battery can be charged by generated electric power obtained from the generator which is driven by the internal combustion engine. As a result, the SOC of the battery is maintained substantially constant. In this way, the CD mode is selected mainly when the SOC of the battery is higher than the threshold th, and the CS mode is selected mainly when the SOC of the battery is lower than the threshold.

RELATED ART LITERATURE

Patent Literature

Patent Literature 1: JP-A-2005-295617
Patent Literature 2: JP-A-2001-238304
Patent Literature 3: WO 2012/090688 A1
Patent Literature 4: WO 2012/090689 A1

SUMMARY OF THE INVENTION

Problem that the Invention is to Solve

As with the hybrid vehicles using the other systems, the series PHEV described above is also required to enhance the NV (Noise Vibration) performance which constitute a driver's evaluation standard of comfortableness of a vehicle. The enhancement in NV performance can be realized easily without driving the internal combustion engine. In the PHEV, however, the SOC of the battery is lowered, and in the event that the electric power supplied from the battery is insufficient for the motor to output a driving force corresponding to a required output, the internal combustion engine is driven for the APU to supply auxiliary or assisting electric power to the motor. It is desirable from the viewpoint of the NV performance that the internal combustion engine driven to supply the auxiliary electric power is driven at low revolution speeds. However, in the event of great auxiliary electric power being required, the internal combustion engine is driven at high revolution speeds. This lowers the NV performance.

For example, when the PHEV is driven continuously on a slope with an upward gradient in such a state that the SOC of the battery is lowered as when the CS mode shown in FIG. 19 is selected the motor is required for a strong driving force for a long time. As this occurs, the APU is required to output auxiliary electric power which is necessary for the motor to output such a high driving force, and therefore, the internal combustion engine is driven at high revolution speeds for a long length of time. This lowers the NV performance. In addition, when such high auxiliary electric power is required then, the internal combustion engine has to be operated at an operating point where the efficiency is not good, leading to the possibility that the efficiency of the APU is lowered.

In order to secure the energy required for the internal combustion engine to be driven at high revolution speeds for a long length of time as shown in FIG. 20, the threshold th of the SOC of the battery at which the CD mode is switched to the CS mode may be set high. In this case, since the SOC of the battery is maintained high at all times, the motor is supplied with sufficient electric power. However, when the vehicle arrives at a destination without the motor being, required to output a high driving force, eventually, the amount of $CO_2$ is increased which is discharged as a result of the internal combustion engine being driven to maintain the SOC of the battery high.

In this way, the amount of energy to be preserved in the battery for preparation for a possible near-future necessity of driving the internal combustion engine at high revolution speeds over a long period of time (a necessary buffer amount in the battery) and the enhancement in NV performance conflict with each other. However, the PHEV is desirably such that the NV performance is never lowered irrespective of the form of a road on which the PHEV is being driven when the motor is required to output a high driving force over a long period of time.

An object of the invention is to provide a generation control apparatus which can make compatible the securing of energy necessary to drive a hybrid vehicle and the NV performance or the generation efficiency.

Means for Solving the Problem

With a view to achieving the object by solving the problem described above, according to an invention of claim 1, there is provided a generation control apparatus for a hybrid vehicle including:

a rechargeable battery (for example, a battery 101 in an embodiment) which supplies electric power to a motor which is a drive source of the hybrid vehicle, a generating unit (for example, an APU 121 in the embodiment) which has an internal combustion engine (for example, an internal combustion engine 109 in the embodiment) and a generator (for example, a generator 111 in the embodiment) which generates electric power by operating the internal combustion engine to supply the generated electric power to the motor or the battery, and the motor (for example, a motor 107 in the embodiment) which is driven by the electric power supplied from at least one of the battery and the generating unit, wherein the generation control apparatus has:

a driving condition evaluation portion (for example, a driving condition evaluation portion 151 in the embodiment) for evaluating a driving condition of the hybrid vehicle from each of viewpoints of energy consumption at the motor, an NV performance of the hybrid vehicle and generation efficiency of the generating unit; and a generating operation determination portion (for example, an APU operation determination portion 153 in the embodiment) for determining whether or not the operation of the generating unit is necessary based on an evaluation parameter of any one or more viewpoints obtained from the driving condition evaluation portion.

Further in the generation control apparatus according to an invention of claim 2, the generating operation determination portion permits the operation of the generating unit when at least one of an energy consumption evaluation parameter which results from executing an evaluation from a viewpoint of the energy consumption at the motor, an NV evaluation parameter which results from executing an evaluation from a viewpoint of the NV performance of the hybrid vehicle and a generation efficiency evaluation parameter which results from executing an evaluation from a viewpoint of the generation efficiency of the generating unit exceeds a first threshold which is set for each evaluation parameter.

Further in the generation control apparatus according to an invention of claim 3, the first threshold is smaller as a substantial available capacity of the battery is smaller.

Further the generation control apparatus according to an invention of claim 4 has:

a charge target deriving portion (for example, a target SOC setting portion 155 in the embodiment) for deriving a highest state of charge out of states of charge of the battery which is necessary for the motor to output energy or an output which is indicated by each evaluation parameter; and an operation control portion (for example, an operation control portion 159 in the embodiment) for controlling the operation of the internal combustion engine so that a state of charge of the battery gets closer to the state of charge which is derived by the charge target deriving portion.

Further in the generation control apparatus according an invention of claim 5, the charge target deriving portion sets a target charge state of the battery step by step towards the highest state of charge until the state of charge of the battery arrives at the highest state of charge, and the operation control portion controls the operation of the internal combustion engine so that the state of charge of the battery becomes the target state of charge.

Further in the generation control apparatus according to an invention of claim 6, a time interval at which the charge target deriving portion sets the target charge state differs according to a time spent in controlling by the operation control portion.

Further in the generation control apparatus according to an invention of claim 7, a time interval at which the charge target deriving portion sets the target charge state differs according to a distance over which the hybrid vehicle travels when control of the operation control portion is performed.

Further in the generation control apparatus according to an invention of claim 8, a time interval at which the charge target deriving portion sets the target charge state differs according to a difference between an actual state of charge of the battery when control of the operation control portion is performed and the highest state of charge.

Further the generation control apparatus according to an invention of claim 9 has:

an efficiency reduction range utilization determination portion (for example, an efficiency reduction range utilization determination portion 261 in the embodiment) for permitting the operation of the generating unit in an efficiency reduction range where the efficiency of the generating unit reduces as the output of the generating unit gets higher when at least one of an energy consumption evaluation parameter which results from executing an evaluation from a viewpoint of the energy consumption at the motor, an NV evaluation parameter which results from executing an evaluation from a viewpoint of the NV performance of the hybrid vehicle and a generation efficiency evaluation parameter which results from executing an evaluation from a viewpoint of the generation efficiency of the generating unit exceeds a second threshold which is set for each evaluation parameter or a substantial available capacity of the battery is less than a predetermined value.

Further in the generation control apparatus according to an invention of claim 10, the second threshold is smaller as a substantial available capacity of the battery is smaller.

Further in the generation control apparatus according to an invention of claim 11, the efficiency reduction range utilization determination portion permits the operation of the generating in a the efficiency reduction range for a predetermined period of time.

Further in the generation control apparatus according to an invention of claim 12, the predetermined period of time is set to be longer as a difference between the evaluation parameters and the second threshold is greater and set to be longer as the substantial available capacity of the battery is smaller, and the efficiency reduction range utilization determination portion sets a longest period of time out of three periods of time according to the differences between the evaluation parameters and the second threshold and a period of the substantial available capacity, as the predetermined period of time.

Further, according to an invention of claim 13, there is provided a generation control apparatus for a hybrid vehicle includes:

a rechargeable battery (for example, a battery 301 in an embodiment) which supplies electric power to a motor which is a drive source of the hybrid vehicle, a generating unit (for example, an APU 321 in the embodiment) which has an internal combustion engine (for example, an internal combustion engine 309 in the embodiment) and a generator (for example, a generator 311 in the embodiment) which generates electric power by operating the internal combustion engine to supply the generated electric power to the motor or the battery, and the motor (for example, a motor 307 in the embodiment) which is driven by th electric power supplied from at least one of the battery and the generating unit, wherein the generation control apparatus has:

a driving condition evaluation portion (for example, a driving condition evaluation portion 351 in the embodiment) for evaluating a driving condition of the hybrid vehicle from viewpoints of energy consumption at the motor, the NV performance of the hybrid vehicle and generation efficiency of the generating unit;

a generating operation determination portion (for example, an APU operation determination portion 353 in the embodiment) for determining whether or not the operation of the generating unit is necessary based on any one or more evaluation parameters of the viewpoints which are obtained from the driving condition evaluation portion; and a generation amount determination portion (for example, a generation amount determination portion 357 in the embodiment or a generation amount setting portion 457 in another embodiment) for determining a highest unit generation amount out of unit generation amounts calculated according to each evaluation parameter, as a generation amount per unit time of the generating unit.

Further in the generation control apparatus according to an invention of claim 14, the generation amount determination portion increases additionally the determined unit generation amount as the substantial available capacity of the battery is smaller.

Further the generation control apparatus according to an invention of claim 15 has:

a charge target deriving portion for deriving a highest state of charge out of states of charge of the battery which is necessary for the motor to output energy or an output which is indicated by each evaluation parameter, wherein the generation amount determination portion increases additionally the determined unit generation amount as an actual state of charge of the battery is smaller with respect to the highest state of charge of the battery which is derived by the charge target deriving portion.

Further the generation control apparatus according to an invention of claim 16 has:

an efficiency reduction range utilization determination portion (for example, an efficiency reduction range utilization determination portion 461 in the embodiment) for permitting the operation of the generating unit in an efficiency reduction range where the efficiency of the generating unit reduces as the output of the generating unit gets higher when at least one of an energy consumption evaluation parameter which results from executing an evaluation from a viewpoint of the energy consumption at the motor, an NV evaluation parameter which results from executing an evaluation from a viewpoint of the NV performance of the hybrid vehicle and a generation efficiency evaluation parameter which results from executing an evaluation from a viewpoint of the generation efficiency of the generating unit exceeds a second threshold which is set for each evaluation parameter or a substantial available capacity of the battery is less than a predetermined value, wherein the generation amount determination portion sets a target unit generation amount as a target generation amount per unit time so that a generation amount per unit time of the generating unit changes step by step towards the determined unit generation amount in an event that the efficiency reduction range utilization determination portion permits the operation of the generating unit in the efficiency reduction range.

Further in the generation control apparatus according to an invention of claim 17, the generation amount determination portion sets a rage of change of the target unit generation amount higher as an energy consumption evaluation parameter which results from executing an evaluation from the viewpoint of the energy consumption at the motor is higher, sets a rate of change of the target unit generation amount higher as an NV evaluation parameter which results from executing an evaluation from the viewpoint of the NV performance of the hybrid vehicle is higher and sets a rate of change of the target unit generation amount higher as a generation efficiency evaluation parameter which results from executing an evaluation from the viewpoint of the generation efficiency of the generating unit is higher, and selects a highest change of rate out of the three set rates of change to set the selected rate of change as a rate of change of the target unit generation amount.

Further in the generation control apparatus according to an invention of claim 18, the generation amount determination portion increases additionally the set rate of change of the target unit generation amount as the substantial available capacity of the battery is smaller.

Further in the generation control apparatus according to an invention of claim 19 has:

a charge target deriving portion (for example, a target SOC setting portion 355 in the embodiment) for deriving a highest state of charge out of states of charge of the battery which is necessary for the motor to output energy or an output which is indicated by each evaluation parameter, wherein the generation amount determination portion increases additionally the set rate of change of the target unit generation amount as an actual state of charge of the battery is smaller with respect to the highest state of charge of the battery which is derived by the charge target deriving portion.

Further in the generation control apparatus according to an invention of claim 20 has:

an operation control portion (for example, an operation amount control portion 359 in the embodiment) for controlling the operation of the internal combustion engine so that the generating unit generates the unit generation amount determined by the generation amount determination portion or the target unit generation amount set by the generation amount determination portion.

Further, according to an invention of claim 21, there is provided in a generation control method for a hybrid vehicle including:

a rechargeable battery which supplies electric power to a motor which is a drive source of the hybrid vehicle, a generating unit which has an internal combustion engine and a generator which generates electric power by operating the internal combustion engine to supply the generated electric power to the motor or the battery, and the motor which is driven by the electric power supplied from at least one of the battery and the generating unit, wherein the generation control method has:

a driving condition evaluation step of evaluating a driving condition of the hybrid vehicle from viewpoints of energy consumption at the motor, the NV performance of the hybrid vehicle and generation efficiency of the generating unit;

a generating operation determination step of determining whether or not the operation of the generating unit is necessary based an evaluation parameter of any one or more viewpoints obtained in the driving condition evaluation portion step;

a charge target deriving step of deriving a highest state of charge out of states of charge of the battery which is necessary for the motor to output energy or an output which is indicated by each evaluation parameter; and an operation control step of controlling the operation of the internal combustion engine so that the state of charge of the battery gets closer to the state of charge which is derived in the charge target deriving step.

Further in the generation control method according, to an invention of claim 22, in the generating operation determination steps, the operation of the generating unit is permitted when at least one of an energy consumption evaluation parameter which results from executing an evaluation from the viewpoint of the energy consumption at the motor, an NV evaluation parameter which results from executing an evaluation from the viewpoint of the NV performance of the hybrid vehicle and a generation efficiency evaluation parameter which results from executing an evaluation from the viewpoint of the generation efficiency of the generating unit exceeds a first threshold which is set for each evaluation parameter; and the generation control method has an efficiency reduction range utilization determination step of permitting the operation of the generating unit in an efficiency reduction range where the efficiency of the generating unit reduces as the output of the generating unit gets higher when at least one of the energy consumption evaluation parameter, the NV evaluation parameter and the generation efficiency evaluation parameter exceeds a second threshold which is set for each evaluation parameter or a substantial available capacity of the battery is less than a predetermined value.

Further the generation control method according to an invention of claim 23 has:

a generation amount determination step of determining a highest unit generation amount in unit generation amounts calculated according to each evaluation parameter, as a generation amount per unit time of the generating unit; and an efficiency reduction range utilization determination step of permitting the operation of the generating unit in an efficiency reduction range where the efficiency of the generating unit reduces as the output of the generating unit gets higher when at least one of an energy consumption evaluation parameter which results from executing an evaluation from the viewpoint of the energy consumption at the motor, an NV evaluation parameter which results from executing an evaluation from the viewpoint of the NV performance of the hybrid vehicle and a generation efficiency evaluation parameter which results from executing an evaluation from the viewpoint of the generation efficiency of the generating unit exceeds a second threshold which is set for each evaluation parameter or a substantial available capacity of the battery is less than a predetermined value, wherein in the generation amount determination step, a target unit generation amount is set as a target generation amount per unit time so that a generation amount per unit time of the generating unit changes step by step towards the determined unit generation amount in an event that the operation of the generating unit is permitted in the efficiency reduction range in the efficiency reduction range utilization determination step.

Advantage of the Invention

According to the generation control apparatus of the inventions according to claims 1 to 12, it is possible to make compatible the securing of energy necessary to drive the hybrid vehicle and the NV performance or the generation efficiency.

According to the generation control apparatus of the invention of claim 3, it is possible to make it easier for the operation of the generating unit to be permitted, as the substantial available capacity of the battery is smaller.

According to the generation control apparatus of the inventions of claims 5 to 8, there is the possibility that the internal combustion engine is operated at high revolution speeds in a case the difference between the actual state of charge and the target state of charge is great. However, the target state of charge is set step by step, and therefore, there is caused no such situation that the operation of the internal combustion engine lowers or deteriorates the NV performance.

According to the generation control apparatus of the inventions of claims 9 to 12, in the event of the state of charge of the battery needing to be enhanced quickly, securing energy necessary to drive the hybrid vehicle can take priority while holding the NV performance.

According to the generation control apparatus of the inventions according to claims 13 to 20, it is possible to make compatible the securing of energy necessary to drive the hybrid vehicle and the NV performance or the generation efficiency.

According to the generation control apparatus of the inventions according to claims 16 to 19, in the event of the state of charge of the battery needing to be enhanced quickly, securing energy necessary to drive the hybrid vehicle can take priority while holding the NV performance.

MODE FOR CARRYING OUT THE INVENTION

Hereinafter, embodiments of the invention will be described by reference to the drawings. In embodiments which will be described hereinafter, the invention will be described as being applied to a series plug-in hybrid electrical vehicle (PHEV). The series PHEV includes a motor and an internal combustion engine and is driven by means of power of the motor which is driven by employing as a power supply a rechargeable battery which can be charged from an exterior or off board power supply. The internal combustion engine is used only to generate electric power. The electric power generated by means of the power of the internal combustion engine is used to charge a battery or is supplied to the motor.

First Embodiment

Figure 1:
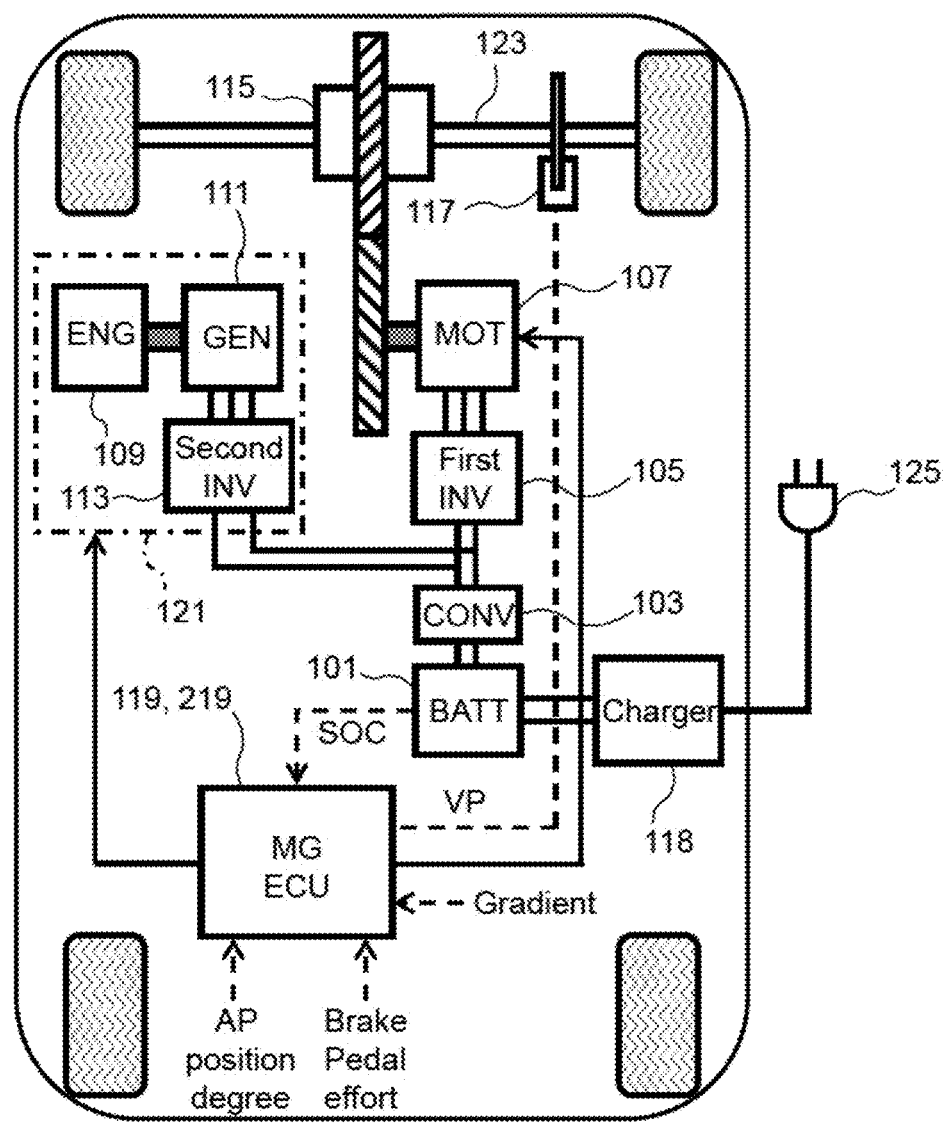
FIG. 1 is a block diagram showing an internal configuration of a series PHEV.

FIG. 1 is a block diagram showing an internal configuration of a series PHEV. As shown in FIG. 1, the series PHEV (hereinafter, referred to simply as a "vehicle") includes a battery (BATT) 101, a converter (CONV) 103, a first inverter (first INV) 105, a motor (Mot) 107, an internal combustion engine (ENG) 109, a generator (GEN) 111, a second inverter (second INV) 113, a gearbox (hereinafter, referred to simply as a "gear") 115, a vehicle speed sensor 117, a charger 118 and a management ECU (MG ECU) 119. In FIG. 1, arrows shown by a dotted line indicate flows of value data, and arrows shown by a solid line indicate flows of control signals that signal instructions. In the following description, the internal combustion engine 109, the generator 111 and the second inverter 113 will collectively be referred to as an "auxiliary power unit (APU) 121."

The battery 101 has a plurality of battery cells which are connected in series and supplies a high voltage in the range of 100 to 200V, for example. The battery cells are, for example, lithium ion battery cells or nickel-metal hydride battery cells. The converter 103 raises or lowers a direct current output voltage of the battery 101 while the voltage outputted remains as direct current. The first inverter 105 converts direct current voltage into alternating current voltage and supplies a three-phase current to the motor 107. The first inverter 105 also converts alternating current voltage which is inputted when the motor 107 is performing a regenerative operation into direct current voltage which is supplied to the battery 101 to charge it.

The motor 107 generates power by means of which the vehicle is driven. Torque generated in the motor 107 is transmitted to a drive shaft 123 by way of the gear 115. A rotor of the motor 107 is connected directly to the gear 115. In addition, the motor 107 operates as a generator when regenerative braking is performed therein, and electric power gem rated in the motor 107 is used to charge the battery 101. The internal combustion engine 109 is used to drive the generator 111 when the vehicle is series driven. The internal combustion engine 109 is connected directly to a rotor of the generator 111. The internal combustion engine 109 is connected to a vehicle body 127 via an engine mount having a vibration isolating function which employs an elastic member (not shown) as a damper such as rubber or a spring.

The generator 111 is driven by means of power of the internal combustion engine 109 to generate electric power. The electric power generated by the generator 111 is used to charge the battery 101 or is supplied to the motor 107. The second inverter 113 converts an alternating current voltage generated by the generator 111 into a direct current voltage. The electric power converted by the second inverter 113 is used to charge the battery 101 or is supplied to the motor 107 via the first inverter 105.

The gear 115 is a one-speed fixed gear which corresponds, for example, to a fifth gear. Consequently, the gear 115 converts a driving force from the motor 107 into a revolution speed and torque at a specific gear ratio and transmits them to the drive shaft 123. The vehicle speed sensor 117 detects a driving speed (a vehicle speed VP) of the vehicle. A signal that signals the vehicle speed VP detected by the vehicle speed sensor 117 is sent to the management ECU 119.

A plug 125 is provided on the charger 118 so as to connect the charger 118 to an exterior power supply. The charger 118 converts an alternating current voltage which is supplied from the exterior power supply via the plug 125 into a direct current voltage and controls the charging of the battery 101 with the direct current voltage.

The management ECU 119 acquires information indicating the vehicle speed VP detected by the vehicle speed sensor 117, an accelerator pedal position degree (AP position degree) corresponding to an accelerator pedal depression made by the driver of the vehicle, brake pedal effort corresponding to a brake pedal depression made by the driver of the vehicle, a gradient of a road on which the vehicle is driven, and a residual capacity (SOC: State of Charge) of the battery 101. The management ECU 119 controls individually the motor 107 and the APU 121.

Figure 2:
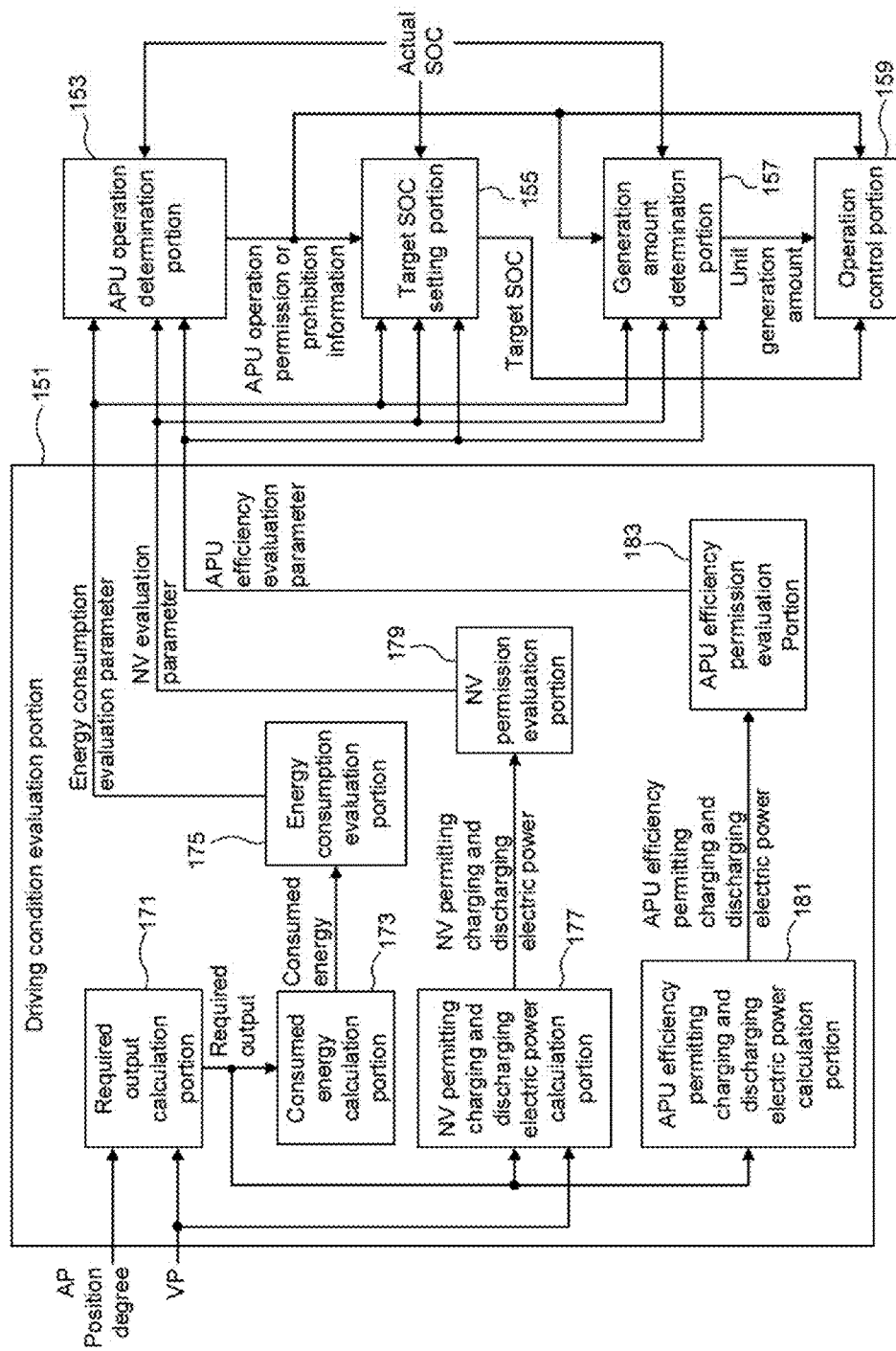
FIG. 2 is a block diagram showing an internal configuration of a management ECU 119 of a first embodiment.

Hereinafter, an interior configuration of the management ECU 119 and the operation thereof will be described in detail. FIG. 2 is a block diagram showing an interior configuration of the management ECU 119 according to the first embodiment. As shown in FIG. 2, the management ECU 119 has a driving condition evaluation portion 151, an APU operation determination portion 153, a target SOC setting portion 155, a generation amount determination portion 157 and an operation control portion 159.

The driving condition evaluation portion 151 evaluates a driving condition of the vehicle from the viewpoints of the energy consumption at the motor 107, the NV performance of the vehicle, and the generation efficiency of the APU 121 (hereinafter, referred to simply as the "efficiency of the APU 121") based on the stoichiometric amount of air (the theoretical mass ratio of air to fuel) of the internal combustion engine 109. The driving condition evaluation portion 151 has, as shown in FIG. 2, a required output calculation portion 171, a consumed energy calculation portion 173, an energy consumption evaluation portion 175, an NV permitting charging and discharging electric power calculation portion 177, an NV permission evaluation portion 179, an APU efficiency permitting charging and discharging electric power calculation portion 181, and an APU efficiency permission evaluation portion 183. The constituent elements of the driving condition evaluation portion 151 will be described as below.

The required output calculation portion 171 calculates an output which is required by the motor 107 which constitutes a drive source of the vehicle (a required output) based on the vehicle speed VP and the AP position degree.

Figure 3:
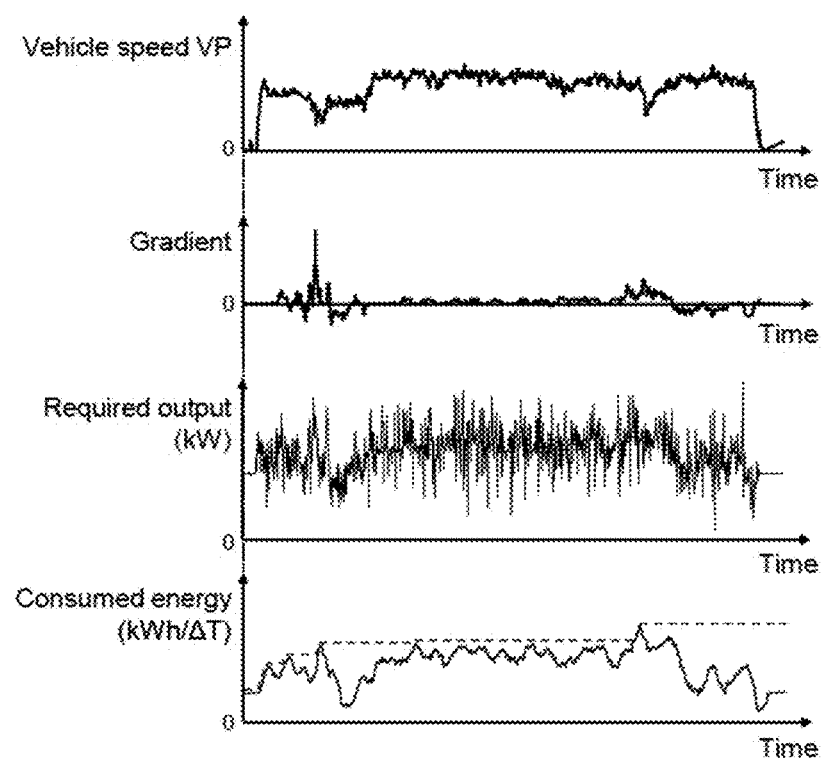
FIG. 3 shows graphs showing an example of changes with time of a vehicle speed, a gradient, a required output, consumed energy and maximum consumed energy since the start of the vehicle from rest.

The consumed energy calculation portion 173 calculates energy (hereinafter, simply referred to as "consumed energy") which is consumed at the motor 107 per unit time ΔT every predetermined control cycle when the motor 107 is driven only by means of electric power supplied from the battery 101 according to the required output. FIG. 3 shows graphs showing an example of changes with time of a vehicle speed, a gradient, a required output, consumed energy and maximum consumed energy since the start of the vehicle from rest. In a lowermost graph shown in FIG. 3, a solid line indicates the consumed energy, and a broken line indicates the maximum consumed energy.

The energy consumption evaluation portion 175 outputs a maximum value of the consumed energy that the consumed energy calculation portion 173 has calculated since the start of the vehicle to the current point in time as a parameter evaluated from the viewpoint of the energy consumption at the motor 107 (an energy consumption evaluation parameter). The energy consumption evaluation parameter outputted by the energy consumption evaluation portion 175 is sent to the APU operation determination portion 153.

Figure 4:
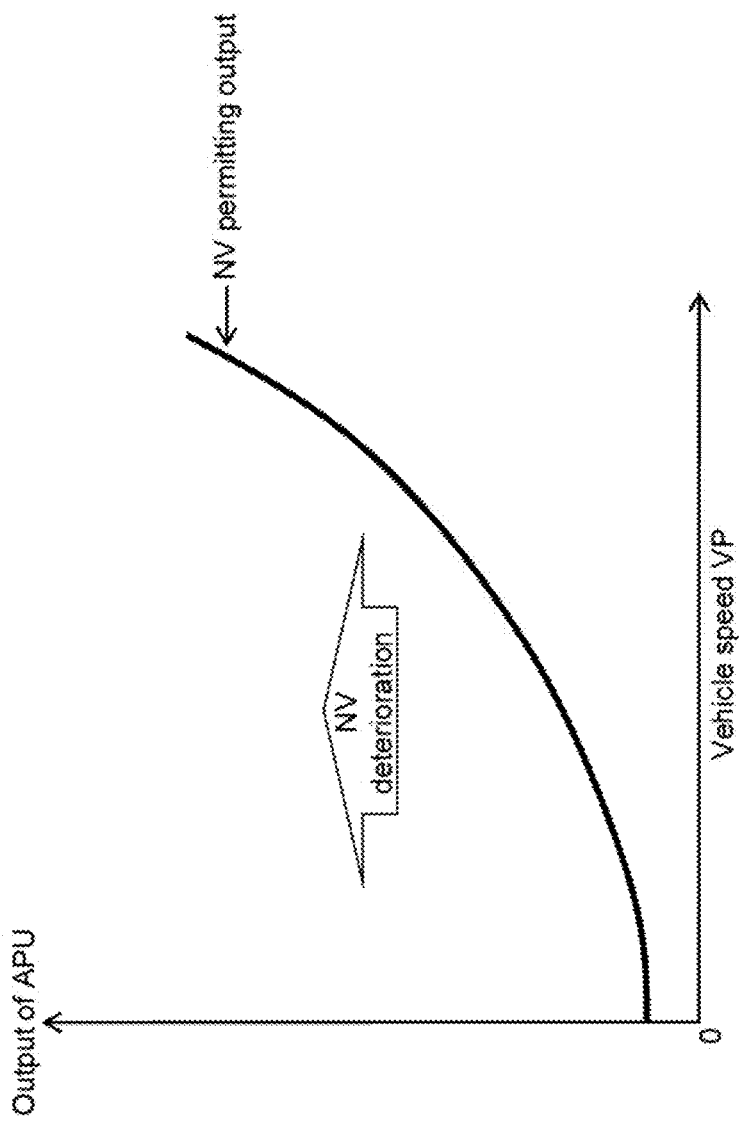
FIG. 4 is a graph showing an NV permitting output of an APU 121 according to a vehicle speed VP.

The NV permitting charging and discharging electric power calculation portion 177 calculates charging and discharging electric power of the battery 101 which corresponds to a difference between the required output per unit time and the NV permitting output of the APU 121 (the required output−the NV permitting output) as "NV permitting charging and discharging electric power." The NV permitting output of the APU 121 is a value which is determined in advance according to the vehicle speed VP. FIG. 4 is a graph showing the NV permitting output of the APU 121 according to the vehicle speed VP. Since road noise gets louder as the vehicle speed VP gets higher, as shown in FIG. 4 the NV permitting output of the APU 121 is set to a higher value as the vehicle speed VP is higher.

Figure 5:
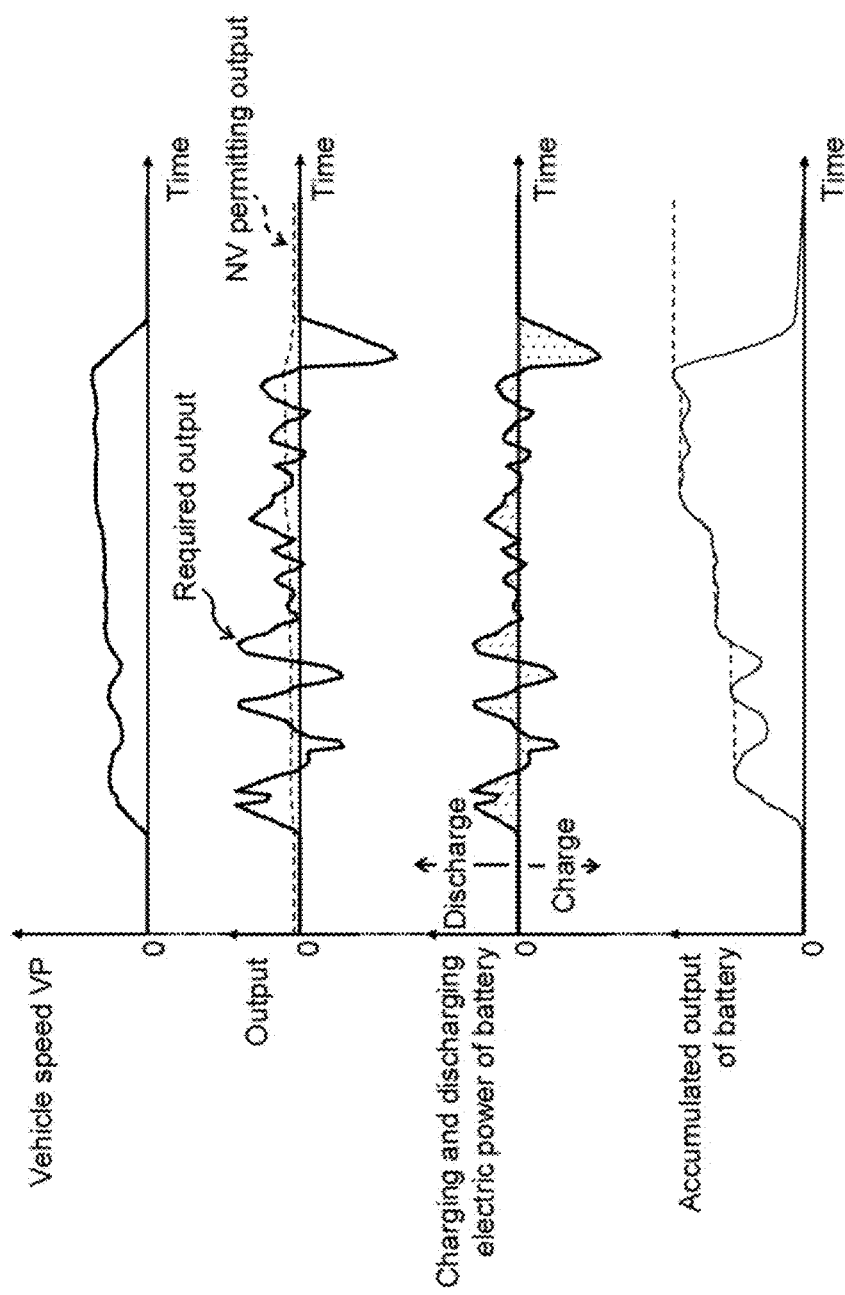
FIG. 5 shows graphs showing an example of changes with time of the vehicle speed VP, the required output and the NV permitting output of the APU 121, electric power with which a battery 101 is charged or discharged and an accumulated output of the battery 101 when a motor 107 is driven while holding the output of the APU 121 to or lower than the NV permitting output thereof since the start of the vehicle from rest.

In the event that the NV permitting charging and discharging electric power calculated by the NV permitting charging and discharging electric power calculation portion 177 takes a positive value, the NV permitting charging and discharging electric power so calculated is equal to the electric power which is discharged from the battery 101 to be supplied to the motor 107. In the event that the NV permitting charging and discharging electric power takes as negative value, the NV permitting charging and discharging electric power is equal to the charging electric power with which the battery 101 is charged as a result of the motor 107 being controlled to perform a regenerative operation. FIG. 5 shows graphs showing an example of changes with time of the vehicle speed VP, the required output and the NV permitting output of the APU 121, electric power with which the battery 101 is charged or discharged and an accumulated output of the battery 101 when the motor 107 is driven while holding the output of the APU 121 to or lower than the NV permitting output thereof since the vehicle has started from rest. In a second uppermost graph in FIG. 5, a solid line indicates the required output, and a broken line indicates the NV permitting output of the APU 121. In a lowermost graph in FIG. 5, a solid line indicates the accumulated output of the battery 101, and a broken line indicates a maximum value of the accumulated output.

The NV permission evaluation portion 179 calculates an accumulated output of the battery 101 from the NV permitting charging and discharging electric power since the start of the vehicle from rest to the current point in time. The NV permission evaluation portion 179 outputs the maximum value of the accumulated output of the battery 101 so calculated as a parameter evaluated from the viewpoint of the NV performance of the vehicle (an NV evaluation parameter). The NV evaluation parameter which is outputted by the NV permission evaluation portion 179 is sent to the APU operation determination portion 153.

Figure 6:
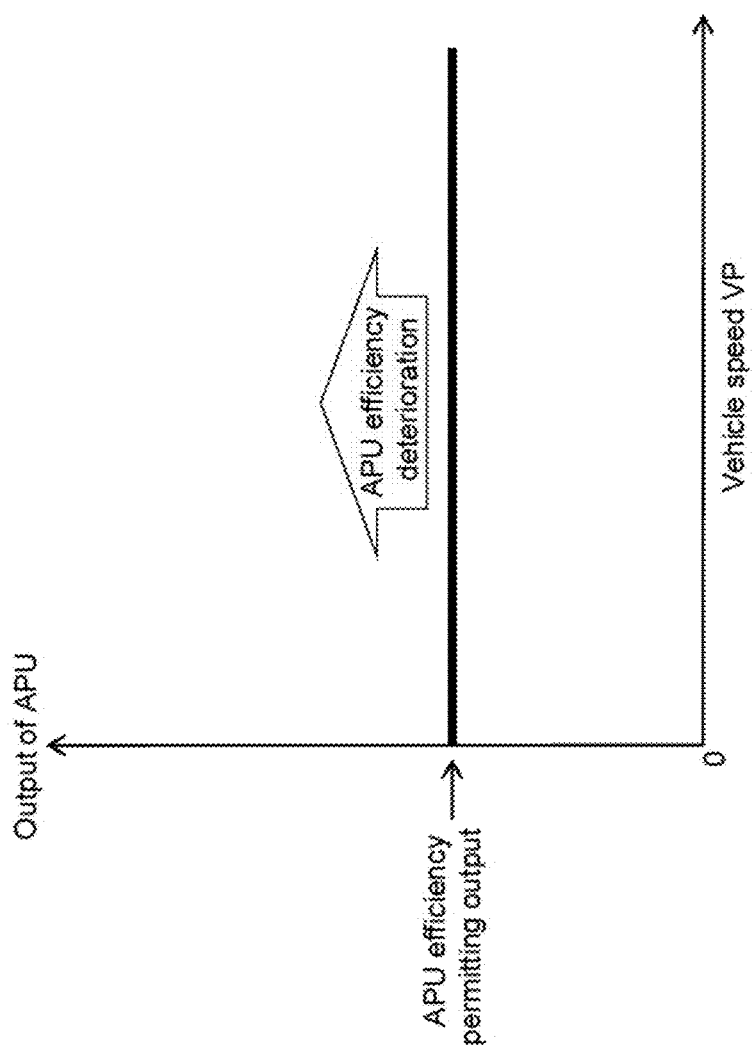
FIG. 6 is a graph showing an APU efficiency permitting output of the APU 21 according to the vehicle speed VP.

The APU efficiency permitting charging and discharging electric power calculation portion 181 calculates charging and discharging electric power of the battery 101 which corresponds to a difference between the required output per unit time and an APU efficiency permitting output (the required output−the APU efficiency permitting output) as "APU efficiency permitting charging and discharging electric power." The APU efficiency permitting output is a value which corresponds to a theoretical air-fuel ratio of the internal combustion engine 109 which is included in the APU 121. FIG. 6 is a graph showing the APU efficiency permitting output of the APU 121 according to the vehicle speed VP.

Figure 7:
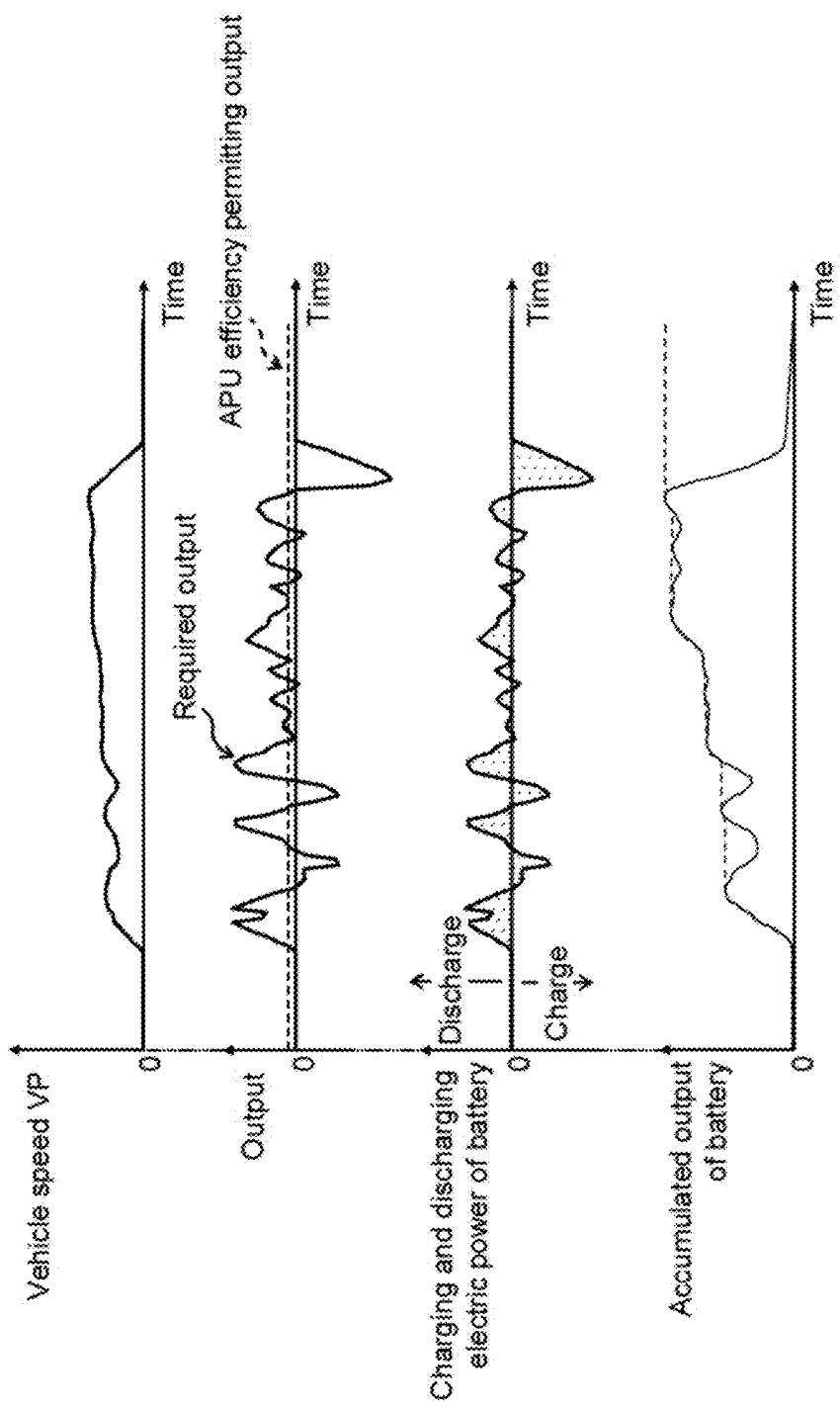
FIG. 7 shows graphs showing an example of changes with time of the vehicle speed VP, the required output and the APU efficiency per output, electric power with which a battery 101 is charged or discharged and an accumulated output of the battery 101 when the motor 107 is driven while holding the output of the APU 121 to or lower than the APU efficiency permitting output thereof since the start of the vehicle from rest.

In the event that the APU efficiency permitting charging and discharging electric power calculated by the APU efficiency permitting charging and discharging electric power calculation portion 181 takes a positive value, the APU efficiency permitting charging and discharging electric power so calculated is equal to the electric power which is discharged from the battery 101 to be supplied to the motor 107. In the event that the APU efficiency permitting charging and discharging electric power takes a negative value, the APU efficiency permitting charging and discharging electric power is equal to the charging electric power with which the battery 101 is charged as a result of the motor 107 being controlled to perform a regenerative operation. FIG. 7 shows graphs showing an example of changes with time of the vehicle speed VP, the required output and the APU efficiency permitting output, electric power with which the battery 101 is charged or discharged and an accumulated output of the battery 101 when the motor 107 is driven while holding the output of the APU 121 to or lower than the APU efficiency permitting output thereof since the start of the vehicle from rest. In a second uppermost graph in FIG. 7, a solid line indicates the required output, and a broken line indicates the APU efficiency permitting output. In a lowermost graph in FIG. 7, a solid line indicates the accumulated output of the battery 101, and a broken line indicates a maximum value of the accumulated output.

The APU efficiency permission evaluation portion 183 calculates an accumulated output of the battery 101 from the APU efficiency permitting charging and discharging electric power since the start of the vehicle from rest to the current point in time. The APU efficiency permission evaluation portion 183 outputs the maximum value of the accumulated output of the battery 101 so calculated as a parameter of the APU 121 which is evaluated from the viewpoint of the stoichiometric amount of air (the theoretical air-fuel ratio) of the internal combustion engine 109 (an APU efficiency evaluation parameter). The APU efficiency evaluation parameter outputted by the APU efficiency permission evaluation portion 183 is sent to the APU operation determination portion 153.

The APU operation determination portion 153 determines whether or not the operation of the APU 121 is necessary based on any one or more of the energy consumption evaluation parameter, the NV evaluation parameter and the APU efficiency evaluation parameter which are obtained from the driving condition evaluation portion 151. Namely, the APU operation determination portion 153 permits the operation of the APU 121 when the APU operation determination portion 153 determines that at least one of the energy consumption evaluation parameter, the NV evaluation parameter and the APU efficiency evaluation parameter exceeds a first threshold set for each of the evaluation parameters. The APU operation determination portion 153 sends information informing of the permission or prohibition of the operation of the APU 121 (APU operation permission or prohibition information) to the target SOC setting portion 155, the generation amount determination portion 157 and the operation control portion 159.

The respective first threshold of the evaluation parameters used by the APU operation determination portion 153 is a variable value corresponding to a difference (an actual SOC–a lower limit SOC) between an actual SOC of the battery 101 (hereinafter, referred to as an "actual SOC") and a lower limit of a range of an SOC which can use the battery 101 (hereinafter, referred to as a "lower limit SOC"). In this embodiment, the first threshold set for the evaluation parameters get lower as the difference indicating the substantial available capacity of the battery 101 is smaller.

The target SOC setting portion 155 calculates an SOC of the battery 101 which is necessary for the motor 107 to output the consumed energy indicated by each of the evaluation parameters or the accumulated output of the battery 101 (hereinafter, referred to as an "evaluation SOC") in the event that the APU operation permission or prohibition information sent from the APU operation determination portion 153 informs of the permission of the operation of the APU 121. Namely, the target SOC setting portion 155 calculates an SOC of the battery 101 which is necessary for the motor 107 to output the maximum value of the consumed energy indicated by the energy consumption parameter during the unit time ΔT as an "energy consumption evaluation SOC." The target SOC setting portion 155 calculates an SOC of the battery 101 which is required to output the maximum value of the accumulated output of the battery 101 which is indicated by the NV evaluation parameter as an "NV evaluation SOC." The target SOC setting portion 155 calculates an SOC of the battery 101 which is required to output the maximum value of the accumulated output of the battery 101 which is indicated by the APU efficiency permission parameter as an "APU efficiency evaluation SOC." The target SOC setting portion 155 selects the evaluation SOC of a highest value out of the three evaluation SOCs (the energy consumption evaluation SOC, the NV evaluation SOC and the APU efficiency evaluation SOC) which are calculated as described above.

The target SOC setting portion 155 sets a target SOC for the battery 101 towards the evaluation SOC so selected (hereinafter, referred to as the "selected evaluation SOC") step by step until the actual SOC of the battery 101 reaches the selected evaluation SOC. Namely, the actual SOC of the battery 101 is caused to move towards the selected evaluation SOC gradually. The target SOC setting portion 155 sets a way in which the actual SOC is caused to move towards the selected evaluation SOC by the way in which the target SOC is changed. For example, the target SOC setting portion 155 sets the difference between the actual SOC and the target SOC to be smaller as the time that has elapsed since the start of the control of causing the actual SOC to move towards the selected evaluation SOC is shorter. The difference between the control SOC and the target SOC is set to be large as the elapsed time is greater. In addition, the target SOC setting portion 155 sets the difference between the actual SOC and the target SOC to be smaller as the travelling distance over which the vehicle has travelled since the start of the control of causing the actual SOC to move towards the selected evaluation SOC is shorter. The difference between the actual SOC and the target SOC is set to be large as the travelling distance is greater. Additionally, the target SOC setting portion 155 sets the difference between the actual SOC and the target SOC to be smaller as the difference between the actual SOC and the selected evaluation SOC is greater and sets the difference between the actual SOC and the target SOC to be greater as the same difference is smaller.

Further, the target SOC setting portion 155 may change the way in which the actual SOC is caused to move towards the selected evaluation SOC depending upon whether the selected evaluation SOC is higher or lower than the actual SOC. For example, when the selected evaluation SOC is higher than the actual SOC, the target SOC setting portion 155 may set the difference between the actual SOC and the target SOC great, while when the selected evaluation SOC is lower than the actual SOC, the target SOC setting portion 155 may set the difference between the actual SOC and the target SOC small.

The generation amount determination portion 157 determines a generation amount of the APU 121 per unit time which corresponds to each of the evaluation parameters (hereinafter, referred to as a "unit generation amount") in the event that the APU operation permission or prohibition information sent from the APU operation determination portion 153 informs of the permission of the operation of the APU 121. The unit generation amount of the APU 121 which corresponds to the evaluation SOC means an amount of generation per unit time which is necessary for the vehicle of this embodiment to cruise by utilizing the driving force from the motor 107 which is driven by means of the generated electric power at the APU 121 while the SOC of the battery 101 does not lowered than the evaluation SOC.

When the generation amount determination portion 157 determines on a unit generation amount, the generation amount determination portion 157 calculates a unit generation amount which is greater as the maximum value of the consumed energy indicated by the energy consumption parameter is higher. The generation amount determination portion 157 calculates a greater unit generation amount as the maximum value of the accumulated output of the battery 101 indicated by the NV evaluation parameter is higher. The generation amount determination portion 157 calculates a greater unit generation amount as the maximum value of the accumulated output of the battery 101 indicated by the APU efficiency permission parameter is higher. The generation amount determination portion 157 selects the greatest unit generation amount out of the three unit generation amounts which are calculated in the ways described above. The generation amount determination portion 157 determines the selected unit generation amount as the generation amount generated per unit time by the APU 121.

The generation amount determination portion 157 may additionally increase the unit generation amount determined as described above more as the difference between the actual SOC and the lower limit SOC of the battery 101 is smaller. Namely, the generation amount determination portion 157 multiplies the unit generation amount determined as described above by a factor corresponding to the difference between the actual SOC and the lower limit SOC. The value of the factor is 1 or greater, and is higher as the difference between the actual SOC and the lower limit SOC is smaller. The generation amount determination portion 157 may additionally increase the unit generation amount determined as described above more as the difference between the selected evaluation SOC and the actual SOC (the selected evaluation SOC−the actual SOC) is greater. Namely, the generation amount determination portion 157 multiplies the unit generation amount determined as described above by a factor corresponding to the difference between the selected evaluation SOC and the actual SOC. The value of the factor is 1 or greater, and is higher as the difference between the evaluation SOC and the actual SOC is greater.

In the event that the APU operation permission or prohibition information sent from the APU operation determination portion 153 informs of the permission of the operation of the APU 121, the operation control portion 159 controls the operation of the internal combustion engine 109 so that the SOC of the battery 101 becomes the target SOC and that the generator 111 of the APU 121 generates the unit generation amount determined by the generation amount determination portion 157.

As has been described heretofore, in this embodiment, whether to permit or prohibit the operation of the APU 121 is determined by utilizing the parameter based on the driving condition of the vehicle which is evaluated from the viewpoint of the energy consumption at the motor 107, the parameter based on the driving condition of the vehicle which is evaluated from the viewpoint of the NV performance of the vehicle and the parameter based on the driving condition of the vehicle which is evaluated from the viewpoint of the efficiency of the APU 121. In this determination, in a case at least one evaluation parameter of the three evaluation parameters exceeds the first threshold specific to the one evaluation parameter, the operation of the APU 121 is permitted. When the operation of the APU 121 is permitted, in the evaluation SOCs of the battery 101 which correspond individually to the evaluation parameters, the evaluation SOC of the highest value is determined as a final target SOC of the battery 101. In addition to this, in the unit generation amounts of the APU 121 which correspond individually to the evaluation parameters, the unit generation amount of the highest value is determined as a generation amount of electric power generated per unit time by the APU 121.

In permitting the operation of the APU 121, the management ECU 119 controls the APU 121 so that the generator 111 generates the unit generation amount as a result of the operation of the internal combustion engine 109 and the SOC of the battery 101 becomes the target SOC. The target SOC is the SOC of the battery 101 which satisfies all the energy consumption resulting from the past or current driving of the vehicle, the NV performance of the vehicle and the efficiency of the APU 121. The unit generation amount is the generation amount of electric power generated per unit time by the APU 121 which satisfies all the energy consumption resulting from the past or current driving of the vehicle, the NV performance of the vehicle and the efficiency of the APU 121. This enables the vehicle to be driven on various types of driving paths without sacrificing anyone of the engine performance and the NV performance of the vehicle and the highly efficient operation performance of the APU 121 while providing such a situation that a future energy consumption can be dealt with in advance.

Second Embodiment

A vehicle according to a second embodiment differs from the vehicle according to the first embodiment in an interior configuration and operation of a management ECU. The second embodiment is similar to the first embodiment excluding the features described above, and hence, the description of features which are the same as or similar to those of the first embodiment will be simplified or omitted.

Figure 8:
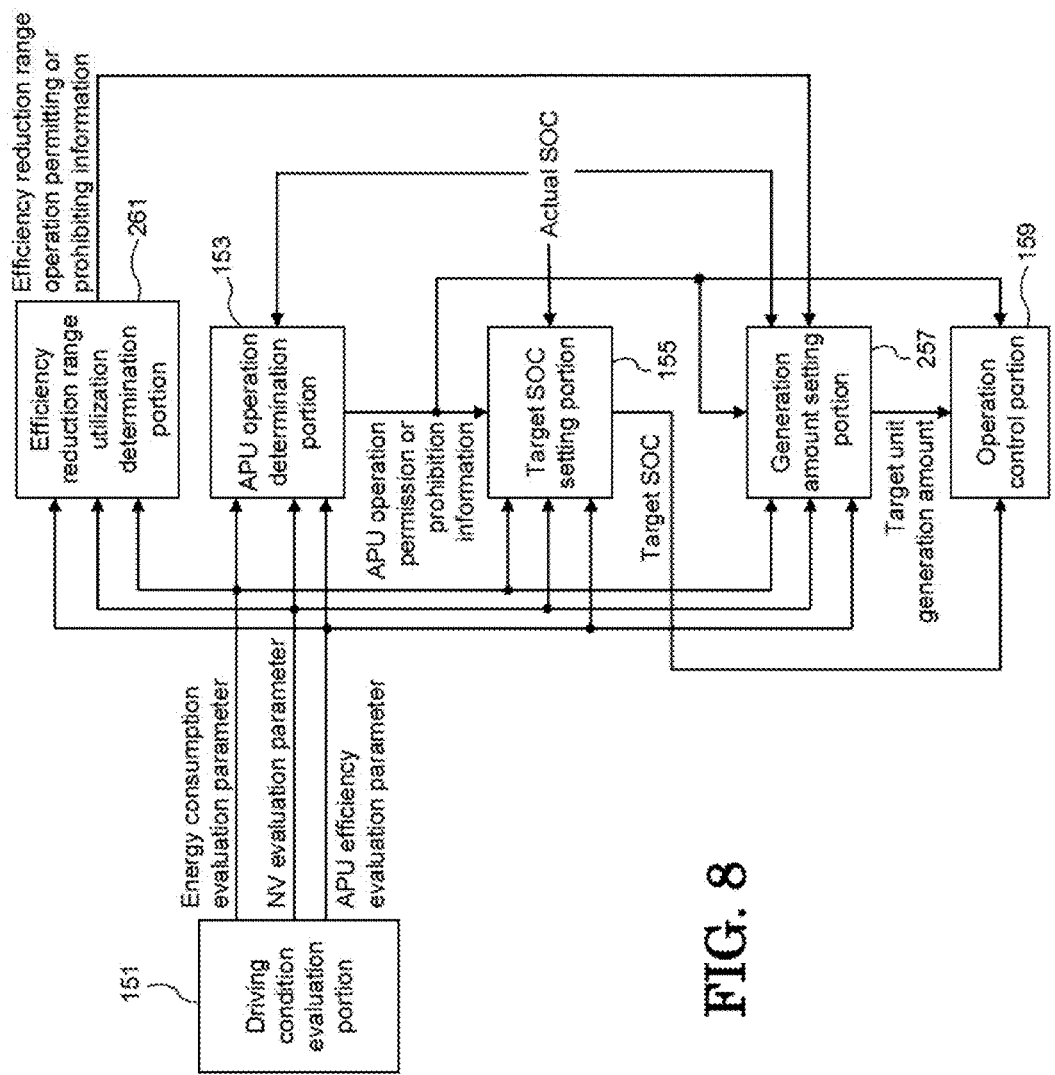
FIG. 8 is a block diagram showing an internal configuration of a management ECU 219 of a second embodiment.

FIG. 8 is a block diagram showing an interior configuration of a management ECU 219 of the second embodiment. In FIG. 8, like reference numerals will be given to constituent elements which are like to those of the management ECU 119 of the first embodiment in FIG. 2. As shown in FIG. 8, the management ECU 219 has a generation amount setting portion 257 in place of the generation amount determination portion 157 of the first embodiment and further an efficiency reduction range utilization determination portion 261.

Namely, when the efficiency reduction range utilization determination portion 261 determines that at least one of an energy consumption evaluation parameter, an NV evaluation parameter and an APU efficiency evaluation parameter which are obtained from a driving condition evaluation portion 151 exceeds a second threshold which is set individually for each of evaluation parameters, the efficiency reduction range utilization determination portion 261 permits the operation of an internal combustion engine 109 in an efficiency reduction range, which will be described later, for a predetermined period of time. The efficiency reduction range utilization determination portion 261 permits the operation of the internal combustion engine 109 at an operation point within the efficiency reduction range for a predetermined period of time even though a differential value between an actual SOC and a lower limit SOC of a battery 101 is smaller than a predetermined value.

Figure 9:
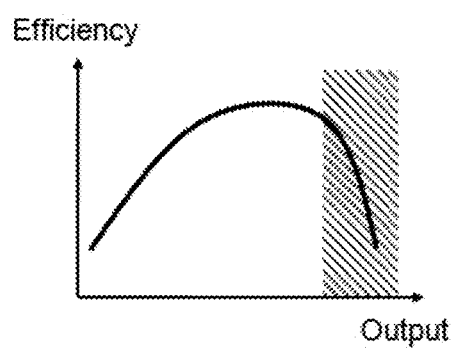
FIG. 9 is a graph showing a relationship between an output and efficiency of an APU 121 according to the operation of an internal combustion engine 109.

FIG. 9 is a graph showing a relationship between an output and efficiency of an APU 121 according to the operation of the internal combustion engine 109. An range shown as hatched in FIG. 9 is the "efficiency reduction range" and in this efficiency reduction range, the efficiency of the APU 121 reduces as the output thereof increases or is higher. The efficiency reduction range utilization determination portion 261 sends information informing of the permission or prohibition of the operation of the internal combustion engine 109 in the efficiency reduction range (efficiency reduction range operation permitting or prohibiting information) to the generation amount setting portion 257.

The respective second threshold of the evaluation parameters which are used in the efficiency reduction range utilization determination portion 261 is a variable value corresponding to a difference between the actual SOC and the lower limit SOC of the battery 101 (the actual SOC–the lower limit SOC). In this embodiment, the second threshold set for the evaluation parameters is lower as the difference indicating the substantial available capacity of the battery 101 is smaller. The second threshold is higher than the first threshold described in the first embodiment.

A period of time over which the efficiency reduction range utilization determination portion 261 permits the operation of the internal combustion engine 109 in the efficiency reduction range (the predetermined period of time) is set longer as the differences between the evaluation parameters and the second threshold is greater and is set longer as the difference between the actual SOC and the lower limit SOC of the battery 101 is smaller. The efficiency reduction range utilization determination portion 261 sets a longest period of time out of three periods of time according to the differences between each evaluation parameter and the second threshold and a period according to the difference between the actual SOC and the lower limit SOC of the battery 101, as the predetermined period of time during which the internal combustion engine 109 is permitted to operate in the efficiency reduction range.

The generation amount setting portion 257 determines a unit generation amount as done by the generation amount determination portion 157 of the first embodiment in the event that APU operation permitting or prohibiting information sent from an APU operation determination portion 153 informs of the permission of the operation of the APU 121. However, in the event that the efficiency reduction range operation permitting or prohibiting information sent from the efficiency reduction range utilization determination portion 261 indicates the permission of the operation of the internal combustion engine 109 in the efficiency reduction range, the generation amount setting portion 257 determines a high unit generation amount. In a case an operation control portion 159 increases drastically the revolution speed of the internal combustion engine 109 according to the high unit generation amount, the NV performance of the vehicle reduces. Because of this, the generation amount setting portion 257 sets a target generation amount per unit time of the APU 121 (hereinafter, referred to as a "target unit generation amount") so that an actual generation amount of electric power generated per unit time by the APU 121 changes step by step towards the unit generation amount determined as described above.

The generation amount setting portion 257 sets a rate of change of the target unit generation amount higher as a maximum value of consumed energy indicated by the energy consumption parameter is higher. The generation amount determination portion 257 sets the rate of change of the target unit generation amount higher as a maximum value of an accumulated output of the battery 101 indicated by the NV evaluation parameter is higher. The generation amount setting portion 257 sets the rate of change of the target unit generation amount higher as a maximum value of an accumulated output of the battery 101 indicated by the APU efficiency permission parameter is higher. The generation amount setting portion 257 selects the highest change of rate out of the three rates of change. The generation amount setting portion 257 sets the selected rate of change as the rate of change of the target unit generation amount.

The generation amount setting portion 257 may additionally increase the rate of change of the target unit generation amount set as described above more as the difference between the actual SOC and the lower limit SOC of the battery 101 is smaller. Namely, the generation amount setting portion 257 multiplies the rate of change set as described above by a factor corresponding to the difference between the actual SOC and the lower limit SOC. The value of the factor is 1 or greater, and is higher as the difference between the actual SOC and the lower limit SOC is smaller. The generation amount setting portion 257 may additionally increase the rate of change of the target unit generation amount set as described above more as the actual SOC is smaller than the evaluation SOC. Namely, the generation amount setting portion 257 multiplies the rate of change set as described above by a factor corresponding to the difference between the evaluation SOC and the actual SOC. The value of the factor is 1 or greater, and is higher is the difference between the evaluation SOC and the actual SOC is greater.

In determining the unit generation amount, the generation amount setting portion 257 sets an upper limit of the unit generation amount so as to get higher as the maximum value of the consumed energy indicated by the energy consumption parameter is higher, as the maximum value of the accumulated output of the battery 101 indicated by the NV evaluation parameter is higher and as the maximum value of the accumulated output of the battery 101 indicated by the APU efficiency permission parameter is higher. The generation amount setting portion 257 selects the highest upper limit value out of the three upper limit values. The generation amount setting portion 257 sets the upper limit of the unit generation amount so selected.

The generation amount setting portion 257 may additionally increase the upper limit value of the unit generation amount set as described above more as the actual SOC is smaller than the evaluation SOC. Namely, the generation amount setting portion 257 multiplies the upper limit value set as described above by a factor corresponding to the difference between the evaluation SOC and the actual SOC. The value of the factor is 1 or greater, and is higher as the difference between the evaluation SOC and the actual SOC is greater. The generation amount setting portion 257 may additionally increase the upper limit value of the unit generation amount set as described above more as the difference between the actual SOC and the lower limit SOC of the battery 101 is smaller. Namely, the generation amount setting portion 257 multiplies the upper limit value set as described above by a factor corresponding to the difference between the actual SOC and the lower limit SOC. The value of the factor is 1 or greater, and is higher as the difference between the actual SOC and the lower limit SOC is smaller.

Thus, as has been described heretofore, according to this embodiment, when the SOC of the battery 101 needs to be increased quickly as when the evaluation parameters are very high or as when the substantial available capacity of the battery 101 is small, the battery 101 can be charged by the high output of the APU 121 while holding the NV performance of the vehicle.

Third Embodiment

Figure 10:
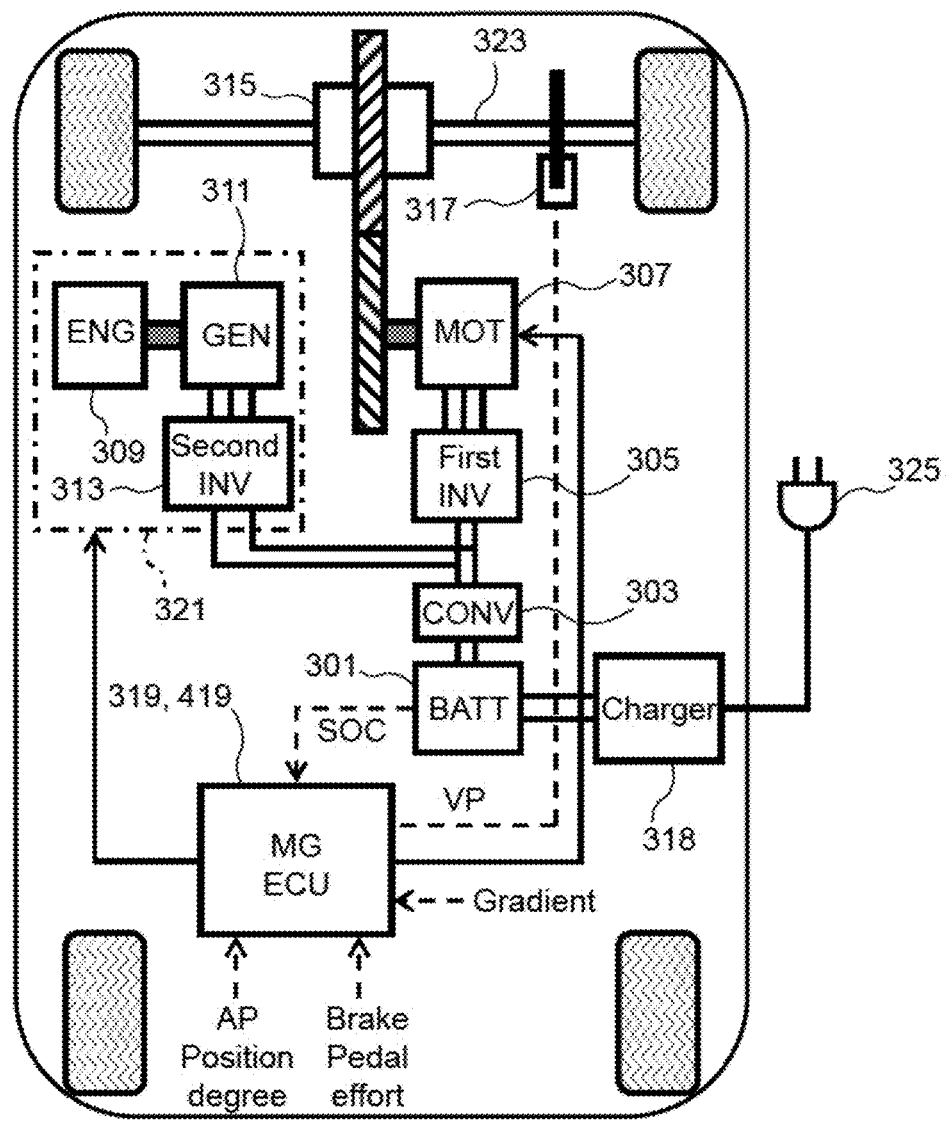
FIG. 10 is a block diagram showing an internal configuration of a series PHEV.

FIG. 10 is a block diagram showing an internal configuration of a series PHEV. As shown in FIG. 10, the series PHEV (hereinafter, referred to simply as a "vehicle") includes a battery (BATT) 301, a converter (CONV) 303, a first inverter (first INV) 305, a motor (Mot) 307, an internal combustion engine (ENG) 309, a generator (GEN) 311, a second inverter (second INV) 313, a gearbox (hereinafter, referred to simply as a "gear") 315, a vehicle speed sensor 317, a charger 318 and a management ECU (MG ECU) 319. In FIG. 10, arrows shown by a dotted line indicate flows of value data, and arrows shown by a solid line indicate flows of control signals that signal instructions. In the following description, the internal combustion engine 309, the generator 311 and the second inverter 313 will collectively be referred to as an "auxiliary power unit (APU) 321."

The battery 301 has a plurality of battery cells which are connected in series and supplies a high voltage in the range of 100 to 200V, for example. The battery cells are, for example, lithium ion battery cells or nickel-metal hydride battery cells. The converter 303 increases or decreases a direct current output voltage of the battery 301 as the voltage outputted remains as direct current. The first inverter 305 converts direct current voltage into alternating current voltage and supplies a three-phase current to the motor 307. The first inverter 305 also converts alternating current voltage which is inputted when the motor 307 is performing a regenerative operation into direct current voltage for supply to the battery 301 to charge it.

The motor 307 generates power by means of which the vehicle is driven. Torque generated in the motor 307 is transmitted to a drive shaft 323 by way of the gear 315. A rotor of the motor 307 is connected directly to the gear 315. In addition, the motor 307 operates as a generator when regenerative braking is performed therein, and electric power generated in the motor 307 is used to charge the battery 301. The internal combustion engine 309 is used to drive the generator 311 when the vehicle is series driven. The internal combustion engine 309 is connected directly to a rotor of the generator 311. In addition, the internal combustion engine 309 is connected to a vehicle body 327 via an engine mount having a vibration isolating function which employs an elastic member (not shown) as a damper such as rubber or a spring.

The generator 311 is driven by means of power of the internal combustion engine 309 to generate electric power. The electric power generated by the generator 311 is used to charge the battery 301 or is supplied to the motor 307. The second inverter 313 converts an alternating current voltage generated by the generator 311 into a direct current voltage. The electric power converted by the second inverter 313 is used to charge the battery 301 or is supplied to the motor 307 via the first inverter 305.

The gear 315 is a one-speed fixed gear which corresponds, for example, to a fifth gear. Consequently, the gear 315 converts a driving force from the motor 307 into a revolution speed and torque at a specific gear ratio and transmits them to the drive shaft 323. A vehicle speed sensor 317 detects a driving speed (a vehicle speed VP) of the vehicle. A signal that signals the vehicle speed VP detected by the vehicle speed sensor 317 is sent to the management ECU 319.

A plug 325 is provided on the charger 318 so as to connect the charger 318 to an exterior power supply. The charger 318 converts an alternating current voltage which is supplied from the exterior power supply via the plug 325 into a direct current voltage and controls the charging of the battery 301 with the direct current voltage.

The management ECU 319 acquires information informing of a vehicle speed VP detected by the vehicle speed sensor 317, an accelerator pedal position degree (AP position degree) corresponding to an accelerator pedal depression by the driver of the vehicle, brake pedal effort corresponding to a brake pedal depression by the driver of the vehicle, a gradient of a road on which the vehicle is driven, and a residual capacity (SOC: State of Charge) of the battery 301. The management ECU 319 controls individually the motor 307 and the APU 321.

Figure 11:
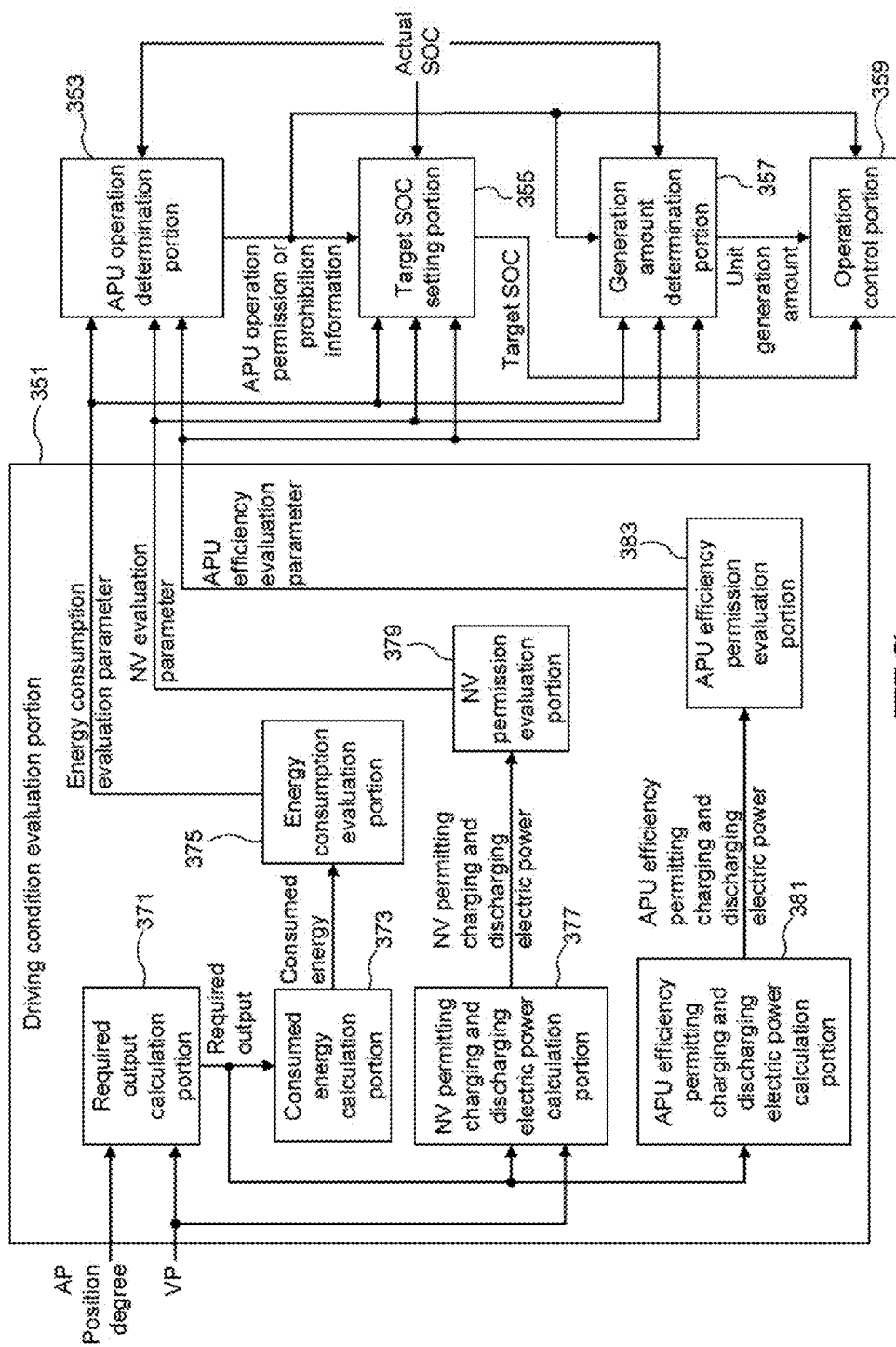
FIG. 11 is a block diagram showing an internal configuration of a management ECU 319 of a third embodiment.

Hereinafter, an interior configuration of the management ECU 319 and the operation thereof will be described in detail. FIG. 11 is a block diagram showing an interior configuration of a management ECU 319 of the third embodiment. As shown in FIG. 11 the management ECU 319 has a driving condition evaluation portion 351, an APU operation determination portion 353, a target SOC setting portion 355, a generation amount determination portion 357 and an operation control portion 359.

The driving condition evaluation portion 351 evaluates a driving condition of the vehicle from the viewpoints of the energy consumption at the motor 307, the NV performance of the vehicle, and the generation efficiency of the APU 321 (hereinafter, referred to simply as the "efficiency of the APU 321") based on the stoichiometric amount of air (the theoretical mass ratio of air to fuel) of the internal combustion engine 309. The driving condition evaluation portion 351 has, as shown in FIG. 11, a required output calculation portion 371, a consumed energy calculation portion 373, an energy consumption evaluation portion 375, an NV permitting charging and discharging electric power calculation portion 377, an NV permission evaluation portion 379, an APU efficiency permitting charging and discharging electric power calculation portion 381, and an APU efficiency permission evaluation portion 383. The constituent elements of the driving condition evaluation portion 351 will be described as below.

The required output calculation portion 371 calculates an output which is required by the motor 307 which constitutes a drive source of the vehicle (a required output) based on the vehicle speed VP and the AP position degree.

Figure 12:
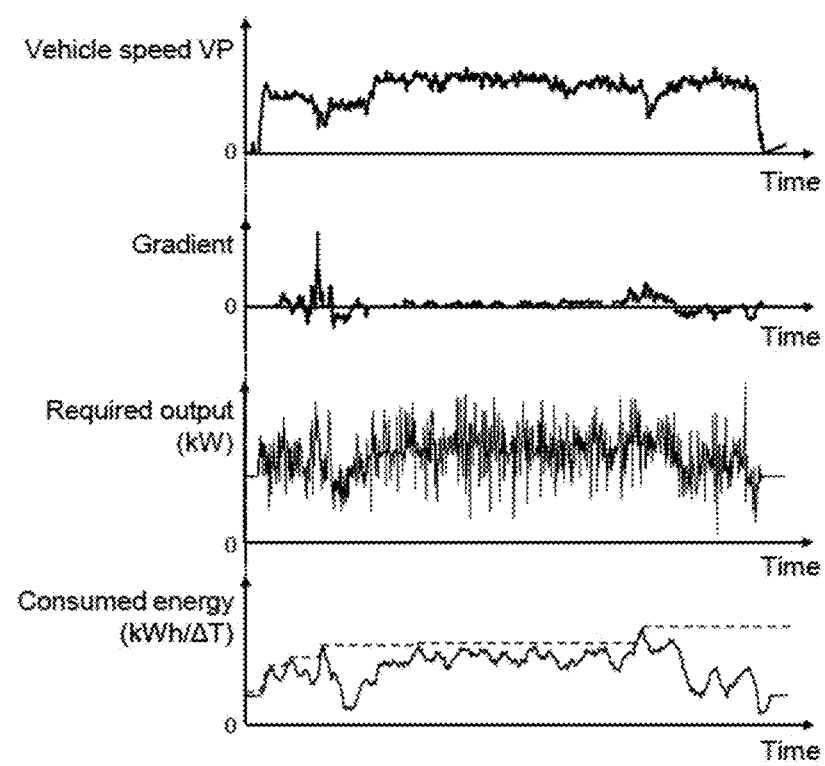
FIG. 12 shows graphs showing an example of changes with time of a vehicle speed, a gradient, a required output, consumed energy and maximum consumed energy since the start of the vehicle from rest.

The consumed energy calculation portion 373 calculates energy (hereinafter, simply referred to as "consumed energy") which is consumed at the motor 307 per unit time ΔT every predetermined control cycle when the motor 307 is driven only by means of electric power supplied from the battery 301 according to the required output. FIG. 12 shows graphs showing an example of changes with time of a vehicle speed, a gradient, a required output, consumed energy and maximum consumed energy since the start of the vehicle from rest. In a lowermost graph shown in FIG. 12, a solid line indicates the consumed energy, and a broken line indicates the maximum consumed energy.

The energy consumption evaluation portion 375 outputs a maximum value of the consumed energy that the consumed energy calculation portion 373 has calculated since the start of the vehicle to the current point in time as a parameter evaluated from the viewpoint of the energy consumption at the motor 307 (an energy consumption evaluation parameter). The energy consumption evaluation parameter outputted by the energy consumption evaluation portion 375 is sent to the APU operation determination portion 353.

Figure 13:
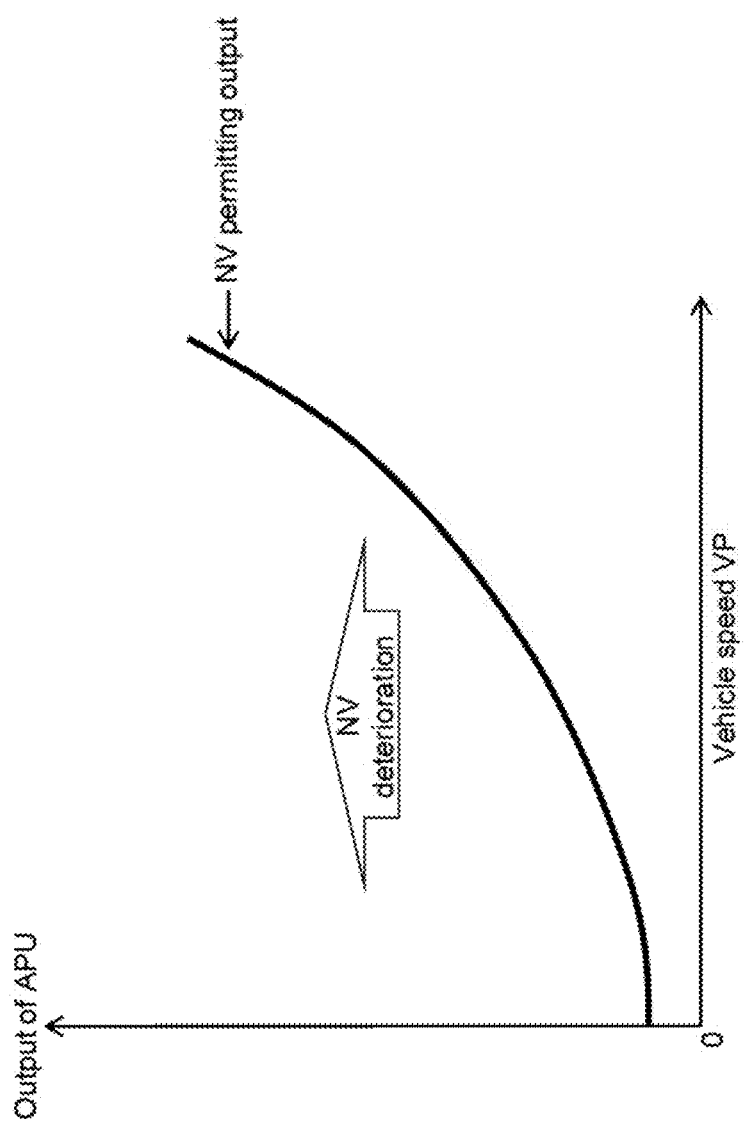
FIG. 13 is a graph showing an NV permitting output of an APU 321 according to a vehicle speed VP.

The NV permitting charging and discharging electric power calculation portion 377 calculates charging and discharging electric power of the battery 301 which corresponds to a difference between the required output per unit time and the NV permitting output of the APU 321 (the required output–the NV permitting output) as "NV permitting charging and discharging electric power." The NV permitting output of the APU 321 is a value which is determined in advance according to the vehicle speed VP. FIG. 13 is a graph showing the NV permitting output of the APU 321 according to the vehicle speed VP. Since road noise gets louder as the vehicle speed VP gets higher, as shown in FIG. 13, the NV permitting output of the APU 321 is set to a higher value as the vehicle speed VP is higher.

Figure 14:
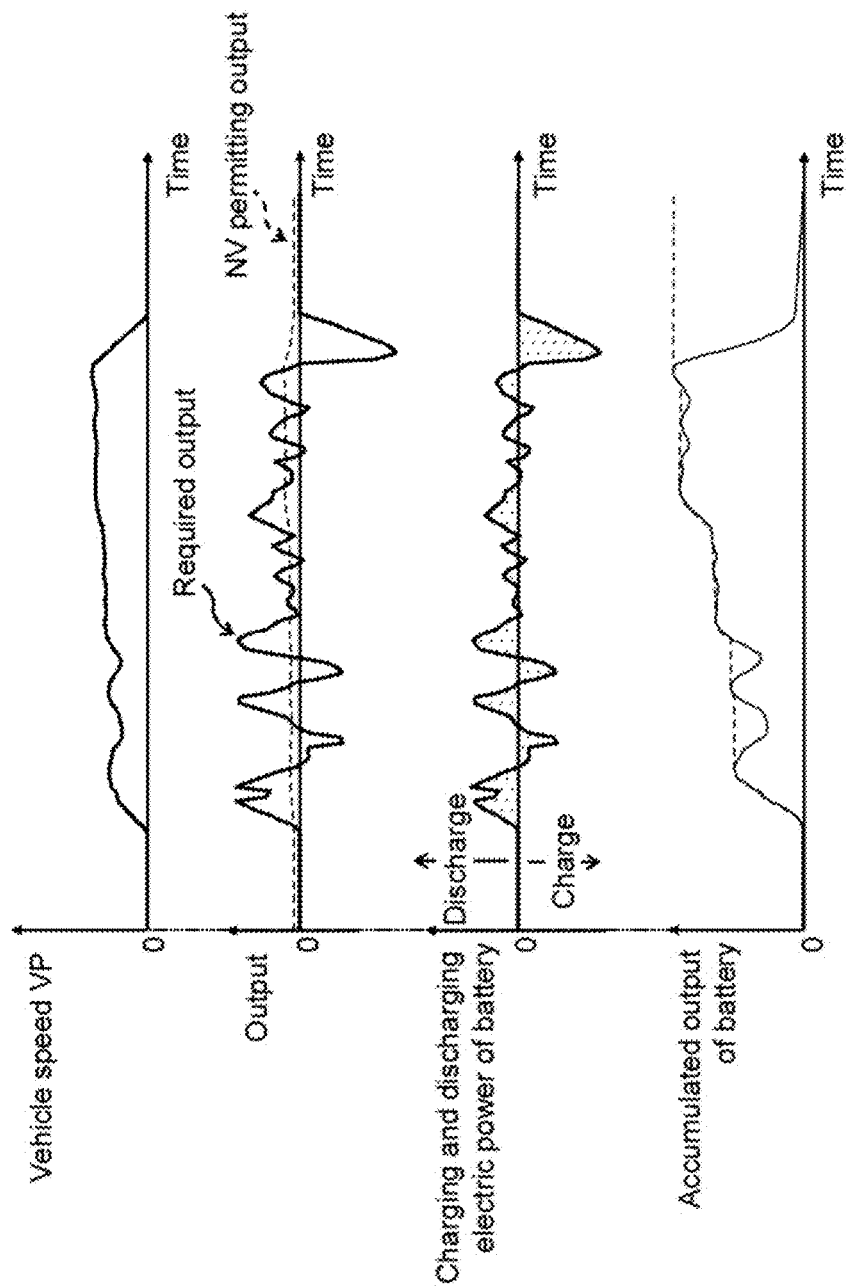
FIG. 14 shows graphs showing an example of changes with time of the vehicle speed VP, the required output and the NV permitting output of the APU 321, electric power with which a battery 301 is charged or discharged and an accumulated output of a battery 301 when a motor 307 is driven while holding the output of the APU 321 to or lower than the NV permitting output thereof since the start of the vehicle from rest.

In the event that the NV permitting charging and discharging electric power calculated by the NV permitting charging and discharging electric power calculation portion 377 takes a positive value, the NV permitting charging and discharging electric power so calculated is equal to the electric power which is discharged from the battery 301 to be supplied to the motor 307. In the event that the NV permitting charging and discharging electric power takes a negative value, the NV permitting charging and discharging electric power is equal to the charging electric power with which the battery 301 is charged as a result of the motor 307 being controlled to perform a regenerative operation. FIG. 14 shows graphs showing an example of changes with time of the vehicle speed VP, the required output and the NV permitting output of the APU 321, electric power with which the battery 301 is charged or discharged and an accumulated output of the battery 301 when the motor 307 is driven while holding the output of the APU 321 to or lower than the NV permitting output thereof since the start of the vehicle from rest. In a second uppermost graph in FIG. 14, a solid line indicates the required output, and a broken line indicates the NV permitting output of the APU 321. In a lowermost graph in FIG. 14, a solid line indicates the accumulated output of the battery 301, and a broken line indicates a maximum value of the accumulated output.

The NV permission evaluation portion 379 calculates an accumulated output of the battery 301 from the NV permitting charging and discharging electric power since the start of the vehicle from rest to the current point in time. The NV permission evaluation portion 379 outputs the maximum value of the accumulated output of the battery 301 so calculated as a parameter evaluated from the viewpoint of the NV performance of the vehicle (an NV evaluation parameter). The NV evaluation parameter which is outputted by the NV permission evaluation portion 379 is sent to the APU operation determination portion 353.

Figure 15:
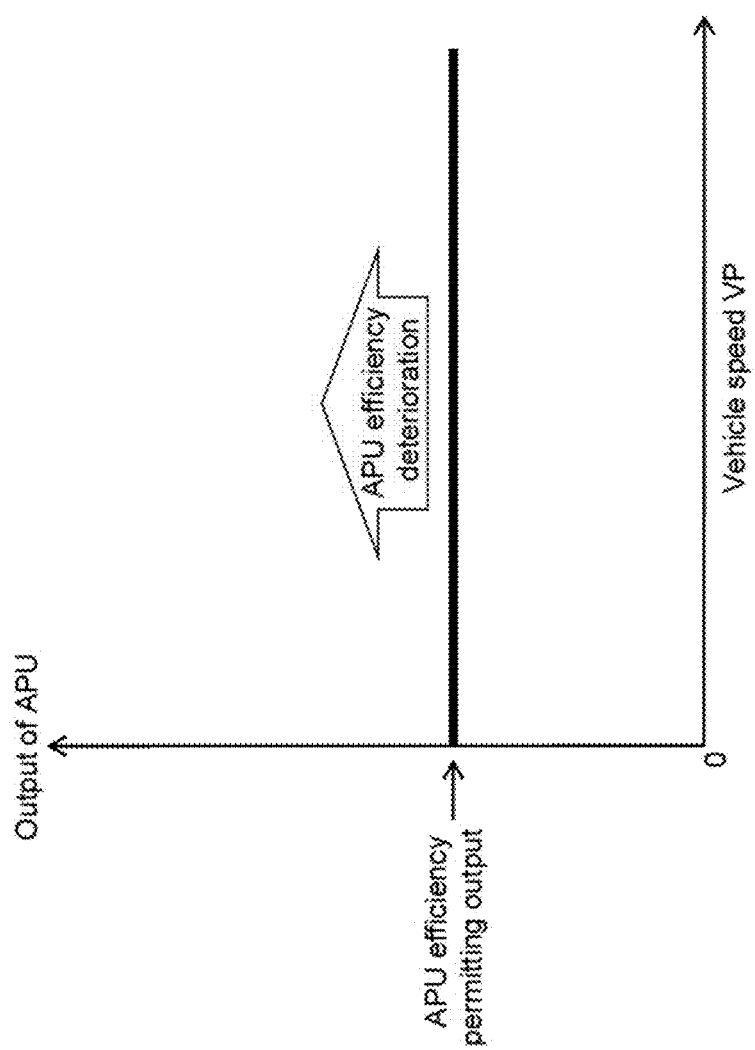
FIG. 15 is a graph showing an APU efficiency permitting output of the APU 321 according to the vehicle speed VP.

The APU efficiency permitting charging and discharging electric power calculation portion 381 calculates charging and discharging electric power of the battery 301 which corresponds to a difference between the required output per unit time and an APU efficiency permitting output (the required output–the APU efficiency permitting output) as "APU efficiency permitting charging, and discharging electric power." The APU efficiency permitting output is a value which corresponds to a theoretical air-fuel ratio of the internal combustion engine 309 which is included in the APU 321. FIG. 15 is a graph showing the APU efficiency permitting output of the APU 321 according to the vehicle speed VP.

Figure 16:
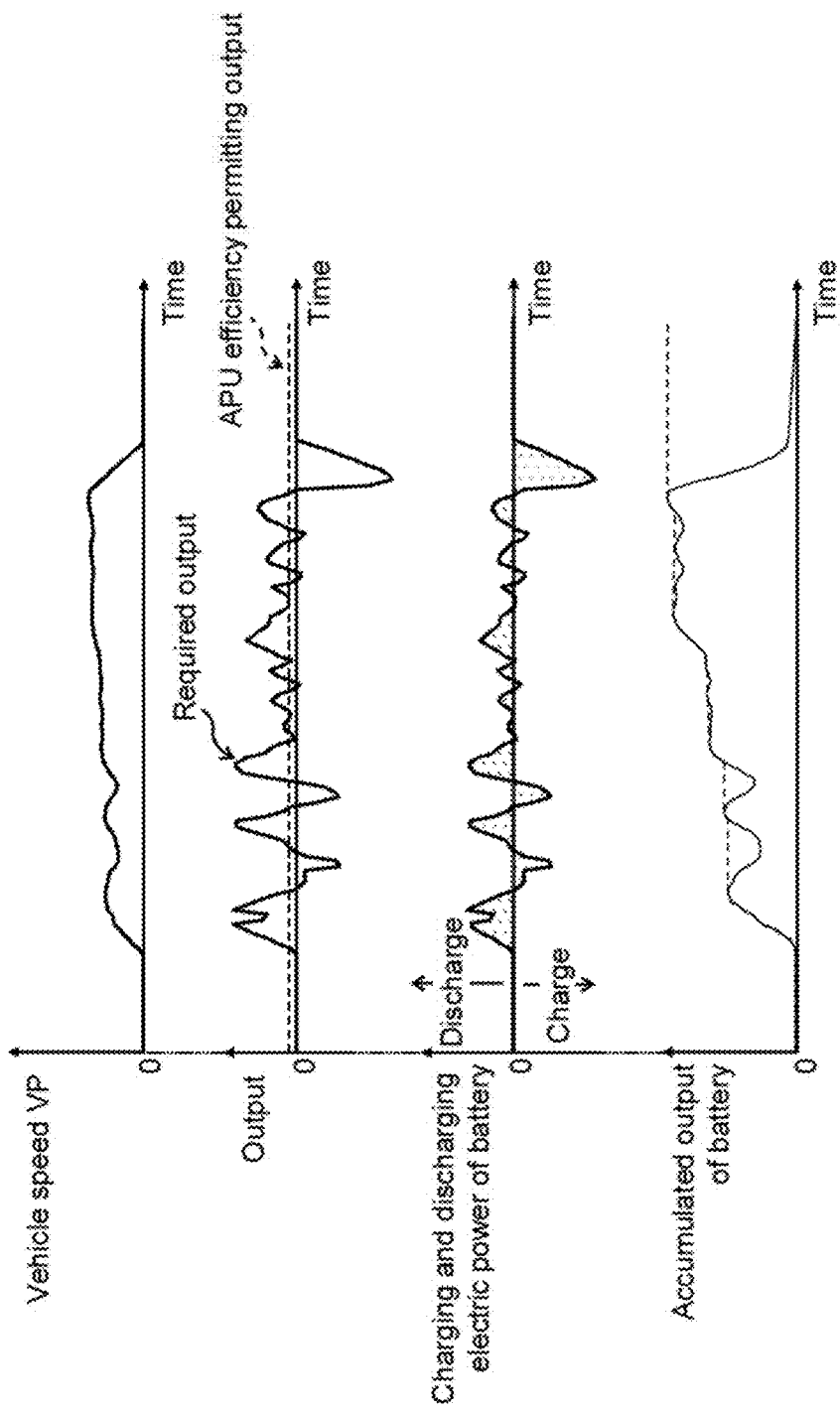
FIG. 16 shows graphs showing an example of changes with time of the vehicle speed VP, the required output and the APU efficiency permitting output, electric power with which the battery 301 is charged or discharged and an accumulated output of the battery 301 when the motor 307 is driven while holding the output of the APU 321 to or lower than the APU efficiency permitting output thereof since the start of the vehicle from rest.

In the event that the APU efficiency permitting charging and discharging electric power calculated by the APU efficiency permitting charging and discharging electric power calculation portion 381 takes a positive value, the APU efficiency permitting charging and discharging electric power so calculated is equal to the electric power which is discharged from the battery 301 to be supplied to the motor 307. In the event that the APU efficiency permitting charging and discharging electric power takes a negative value, the APU efficiency permitting charging and discharging electric power is equal to the charging electric power with which the battery 301 is charged as a result of the motor 307 being controlled to perform a regenerative operation. FIG. 16 shows graphs showing an example of changes with time of the vehicle speed VP, the required output and the APU efficiency permitting output, electric power with which the battery 301 is charged or discharged and an accumulated output of the battery 301 when the motor 307 is driven while holding the output of the APU 321 to or lower than the APU efficiency permitting output thereof since the start of the vehicle from rest. In a second uppermost graph in FIG. 16, a solid line indicates the required output, and a broken line indicates the APU efficiency permitting output. In a lowermost graph in FIG. 16, a solid line indicates the accumulated output of the battery 301, and a broken line indicates a maximum value of the accumulated output.

The APU efficiency permission evaluation portion 383 calculates an accumulated output of the battery 301 from the APU efficiency permitting charging and discharging electric power since the start of the vehicle from rest to the current point in time. The APU efficiency permission evaluation portion 383 outputs the maximum value of the accumulated output of the battery 301 so calculated as a parameter of the APU 321 which is evaluated from the viewpoint of the stoichiometric amount of air (the theoretical air-fuel ratio) of the internal combustion engine 309 (an APU efficiency evaluation parameter). The APU efficiency evaluation parameter outputted by the APU efficiency permission evaluation portion 383 is sent to the APU operation determination portion 353.

The APU operation determination portion 353 determines whether or not the operation of the APU 321 is necessary based on any one or more of the energy consumption evaluation parameter, the NV evaluation parameter and the APU efficiency evaluation parameter which are obtained from the driving condition evaluation portion 351. Namely, the APU operation determination portion 353 permits the operation of the APU 321 when the APU operation determination portion 353 determines that at least one of the energy consumption evaluation parameter, the NV evaluation parameter and the APU efficiency evaluation parameter exceeds a first threshold set for each of the evaluation parameters. The APU operation determination portion 353 sends information informing of the permission or prohibition of the operation of the APU 321 (APU operation permission or prohibition information) to the target SOC setting portion 355, the generation amount determination portion 357 and the operation control portion 359.

The respective first threshold of the evaluation parameters used by the APU operation determination portion 353 is a variable value corresponding to a difference (an actual SOC–a lower limit SOC) between an actual SOC of the battery 301 (hereinafter, referred to as an "actual SOC") and a lower limit of a range of an SOC which can use the battery 301 (hereinafter, referred to as a "lower limit SOC"). In this embodiment, the first threshold set for the evaluation parameters get lower as the difference indicating the substantial available capacity of the battery 301 is smaller.

The target SOC setting portion 355 calculates an SOC of the battery 301 which is necessary for the motor 307 to output the consumed energy indicated by each of the evaluation parameters or the accumulated output of the battery 301 (hereinafter, referred to as an "evaluation SOC") in the event that the APU operation permission or prohibition information sent from the APU operation determination portion 353 informs of the permission of the operation of the APU 321. Namely, the target SOC setting portion 355 calculates an SOC of the battery 301 which is necessary for the motor 307 to output the maximum value of the consumed energy indicated by the energy consumption parameter during the unit time ΔT as an "energy consumption evaluation SOC." The target SOC setting portion 355 calculates an SOC of the battery 301 which is required to output the maximum value of the accumulated output of the battery 301 which is indicated by the NV evaluation parameter as an "NV evaluation SOC." The target SOC setting portion 355 calculates an SOC of the battery 301 which is required to output the maximum value of the accumulated output of the battery 301 which is indicated by the APU efficiency permission parameter as an "APU efficiency evaluation SOC." The target SOC setting portion 355 selects the evaluation SOC of a highest value out of the three evaluation SOCs (the energy consumption evaluation SOC, the NV evaluation SOC and the APU efficiency evaluation SOC) which are calculated as described above.

The target SOC setting portion 355 sets a target SOC for the battery 301 towards the evaluation SOC so selected (hereinafter, referred to as the "selected evaluation SOC") step by step until the actual SOC of the battery 301 reaches the selected evaluation SOC. Namely, the actual SOC of the battery 301 is caused to move towards the selected evaluation SOC gradually. The target SOC setting portion 355 sets a way in which the actual SOC is caused to move towards the selected evaluation SOC by the way in which the target SOC is changed. For example, the target SOC setting portion 355 sets the difference between the actual SOC and the target SOC so as to get smaller as the time that has elapsed since the start of the control of causing the actual SOC to move towards the selected evaluation SOC is shorter. The difference between the actual SOC and the target SOC is set to be large as the elapsed time is greater. In addition, the target SOC setting portion 355 sets the difference between the actual SOC and the target SOC so as to get smaller as the travelling distance over which the vehicle has travelled since the start of the control of causing the actual SOC to move towards the selected evaluation SOC is shorter. Additionally, the target SOC setting portion 355 sets the difference between the actual SOC and the target SOC so as to get smaller as the difference between the actual SOC and the selected evaluation SOC is greater and sets the difference between the actual SOC and the target SOC so as to get greater as the same difference is smaller.

Further, the target SOC setting portion 355 may change the way in which the actual SOC is caused to move towards the selected evaluation SOC depending upon whether the selected evaluation SOC is higher or lower than the actual SOC. For example, when the selected evaluation SOC is higher than the actual SOC, the target SOC setting portion 355 may set the difference between the actual SOC and the target SOC great, while when the selected evaluation SOC is lower than the actual SOC, the target SOC setting portion 355 may set the difference between the actual SOC and the target SOC small.

The generation amount determination portion 357 determines a generation amount of the APU 321 per unit time which corresponds to each of the evaluation parameters (hereinafter, referred to as a "unit generation amount") in the event that the APU operation permission or prohibition information sent from the APU operation determination portion 353 informs of the permission of the operation of the APU 321. The unit time generation amount of the APU 321 which corresponds to the evaluation SOC means an amount of generation per unit time which is necessary for the vehicle of this embodiment to cruise by utilizing the driving force from the motor 307 which is driven by means of the generated electric power at the APU 321 without involving a reduction in the SOC of the battery 301 from the selected evaluation SOC described above.

When the generation amount determination portion 357 determines on a unit generation amount, the generation amount determination portion 357 calculates a unit generation amount which is greater as the maximum value of the consumed energy indicated by the energy consumption parameter is higher. The generation amount determination portion 357 calculates a greater unit generation amount as the maximum value of the accumulated output of the battery 301 indicated by the NV evaluation parameter is higher. The generation amount determination portion 357 calculates a greater unit generation amount as the maximum value of the accumulated output of the battery 301 indicated by the APU efficiency permission parameter is higher. The generation amount determination portion 357 selects the greatest unit generation amount out of the three unit generation amounts which are calculated in the ways described above. The generation amount determination portion 357 determines the selected unit generation amount as the generation amount generated per unit time by the APU 321.

The generation amount determination portion 357 may additionally increase the unit generation amount determined as described above more as the difference between the actual SOC and the lower limit SOC of the battery 301 is smaller. Namely, the generation amount determination portion 357 multiplies the unit generation amount determined as described above by a factor corresponding to the difference between the actual SOC and the lower limit SOC. The value of the factor is 1 or greater, and is higher as the difference between the actual SOC and the lower limit SOC is smaller. The generation amount determination portion 357 may additionally increase the unit generation amount determined as described above more as the difference between the selected evaluation SOC and the actual SOC (the selected evaluation SOC–the actual SOC) is greater. Namely, the generation amount determination portion 357 multiplies the unit generation amount determined as described above by a factor corresponding to the difference between the selected evaluation SOC and the actual SOC. The value of the factor is 1 or greater, and is higher as the difference between the evaluation SOC and the actual SOC is greater.

In the event that the APU operation permission or prohibition information sent from the APU operation determination portion 353 informs of the permission of the operation of the APU 321, the operation control portion 359 controls the operation of the internal combustion engine 309 so that the SOC of the battery 301 becomes the target SOC and that the generator 311 of the APU 321 generates the unit generation amount determined by the generation amount determination portion 357.

As has been described heretofore, in this embodiment, whether to permit or prohibit the operation of the APU 321 is determined by utilizing the parameter based on the driving condition of the vehicle which is evaluated from the viewpoint of the energy consumption at the motor 307, the parameter based on the driving condition of the vehicle which is evaluated from the viewpoint of the NV performance of the vehicle and the parameter based on the driving condition of the vehicle which is evaluated from the viewpoint of the efficiency of the APU 321. In this determination, in a case at least one evaluation parameter of the three evaluation parameters exceeds the first threshold specific to the one evaluation parameter, the operation of the APU 321 is permitted. When the operation of the APU 321 is permitted, in the evaluation SOCs of the battery 301 which correspond individually to the evaluation parameters, the evaluation SOC of the highest value is determined as a final target SOC of the battery 301. In addition to this, in the unit generation amounts of the APU 321 which correspond individually to the evaluation parameters, the unit generation amount of the highest value is determined as a generation amount of electric power generated per unit time by the APU 321.

In permitting the operation of the APU 321, the management ECU 319 controls the APU 321 so that the generator 311 generates the unit generation amount as a result of the operation of the internal combustion engine 309 and the SOC of the battery 301 becomes the target SOC. The target SOC is the SOC of the battery 301 which satisfies all the energy consumption resulting from the past or current driving of the vehicle, the NV performance of the vehicle and the efficiency of the APU 321. The unit generation amount is the generation amount of electric power generated per unit time by the APU 321 which satisfies all the energy consumption resulting from the past or current driving of the vehicle, the NV performance of the vehicle and the efficiency of the APU 321. This enables the vehicle to be drive on various types of driving paths without sacrificing anyone of the engine performance and the NV performance of the vehicle and the highly efficient operation performance of the APU 321 while providing such a situation that a future energy consumption can be dealt with in advance.

Fourth Embodiment

A vehicle according to a fourth embodiment differs from the vehicle according to the third embodiment in an interior configuration and operation of a management ECU. The fourth embodiment is similar to the third embodiment excluding the features described above, and hence, the description of features which are the same as or similar to those of the third embodiment will be simplified or omitted.

Figure 17:
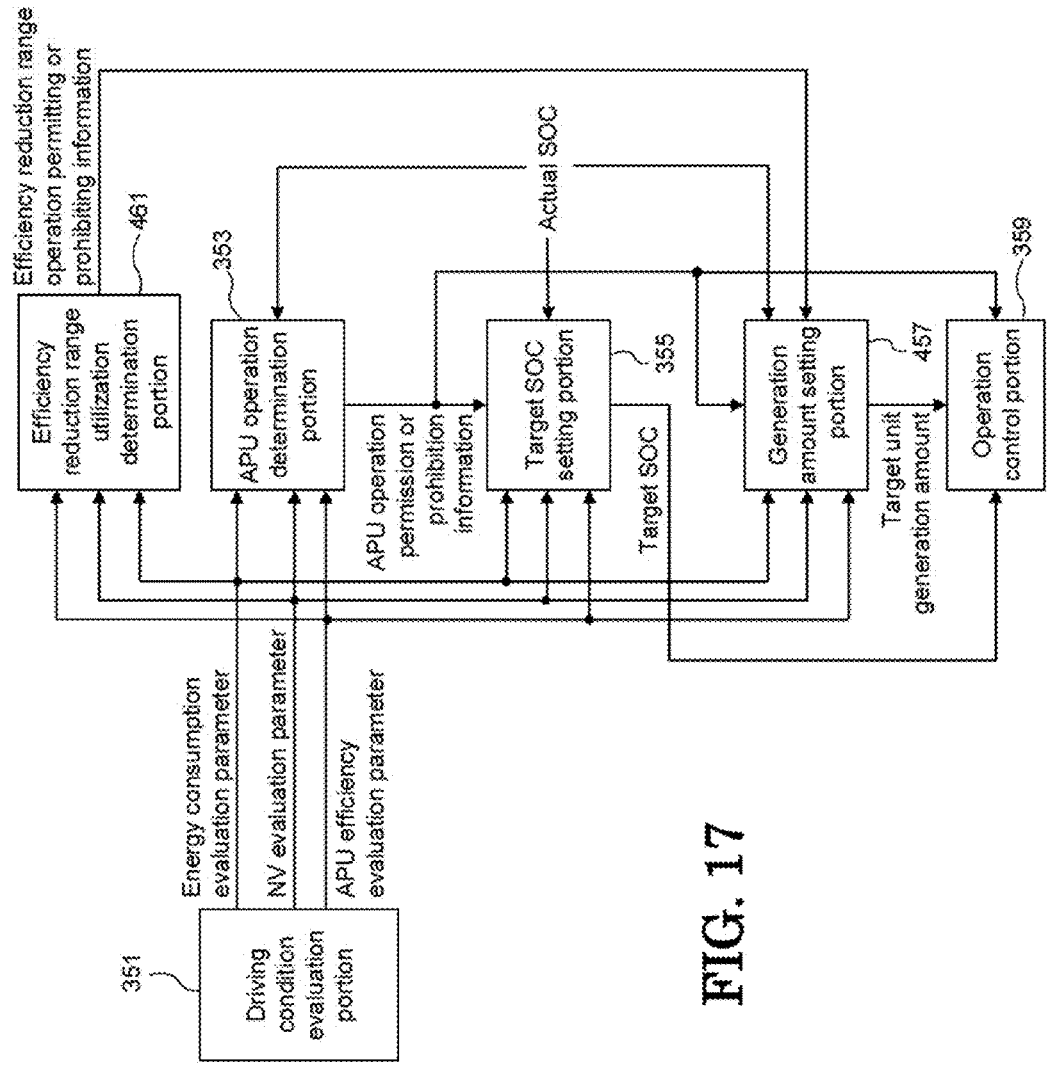
FIG. 17 is a block diagram showing an internal configuration of a management ECU 419 of a fourth embodiment.

FIG. 17 is a block diagram showing an internal configuration of a management ECU 419 of the fourth embodiment. In FIG. 17, like reference numerals will be given to constituent elements which are like to those of the management ECU 319 of the third embodiment shown in FIG. 11. As shown in FIG. 17, the management ECU 419 has a generation amount setting portion 457 in place of the generation amount determination portion 357 of the third embodiment and further an efficiency reduction range utilization determination portion 461.

Namely, when the efficiency reduction range utilization determination portion 461 determines that at least one of an energy consumption evaluation parameter, an NV evaluation parameter and an APU efficiency evaluation parameter which are obtained from a driving condition evaluation portion 351 exceeds a second threshold which is set individually for each of evaluation parameters, the efficiency reduction range utilization determination portion 461 permits the operation of an internal combustion engine 309 in an efficiency reduction range, which will be described later, for a predetermined period of time. The efficiency reduction range utilization determination portion 461 permits the operation of the internal combustion engine 309 at an operation point within the efficiency reduction range for a predetermined period of time even though a differential value between an actual SOC and a lower limit SOC of a battery 301 is smaller than a predetermined value.

Figure 18:
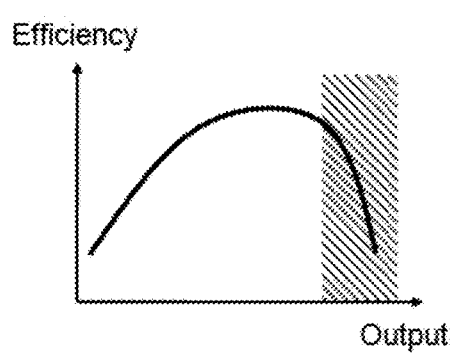
FIG. 18 is a graph showing a relationship between an output and efficiency of an APU 321 according to the operation of an internal combustion engine 309.
Figure 19:
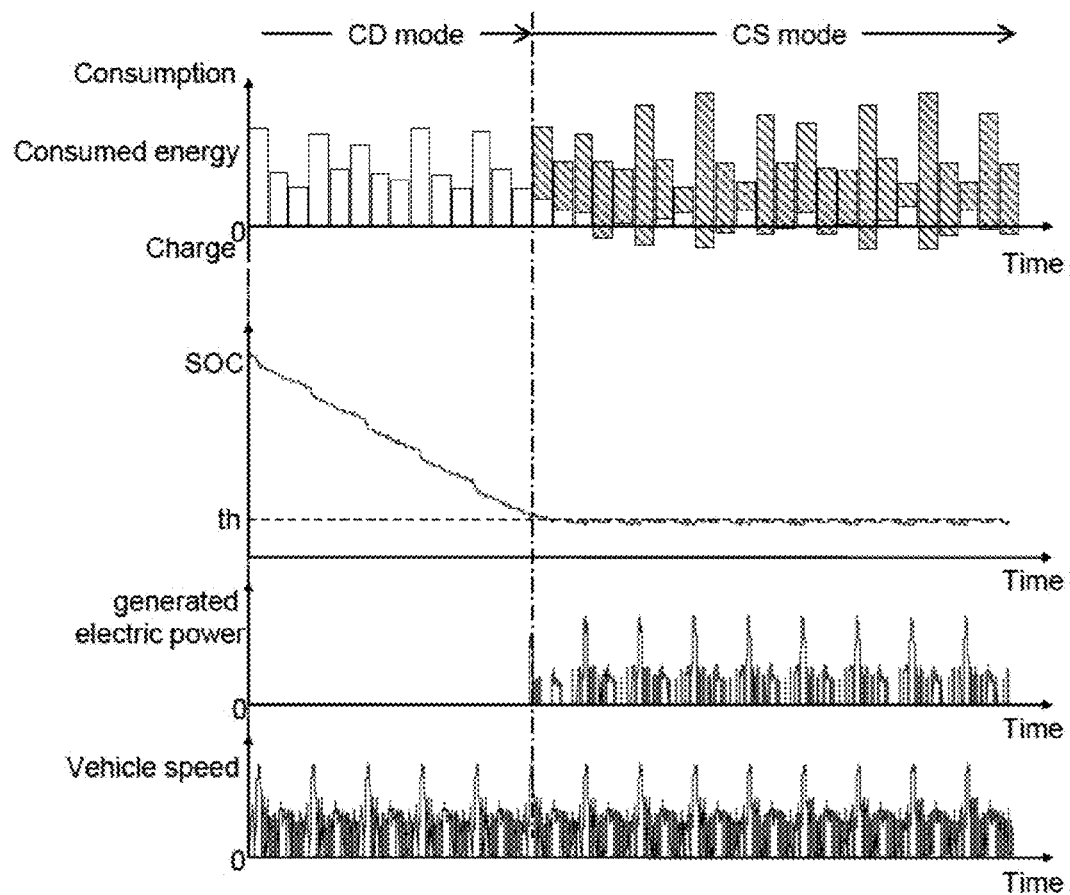
FIG. 19 shows graphs showing an example of changes with time of consumed energy, the SOC of a battery, generated electric power by a generator and a vehicle speed as the PHEV is driven.
Figure 20:
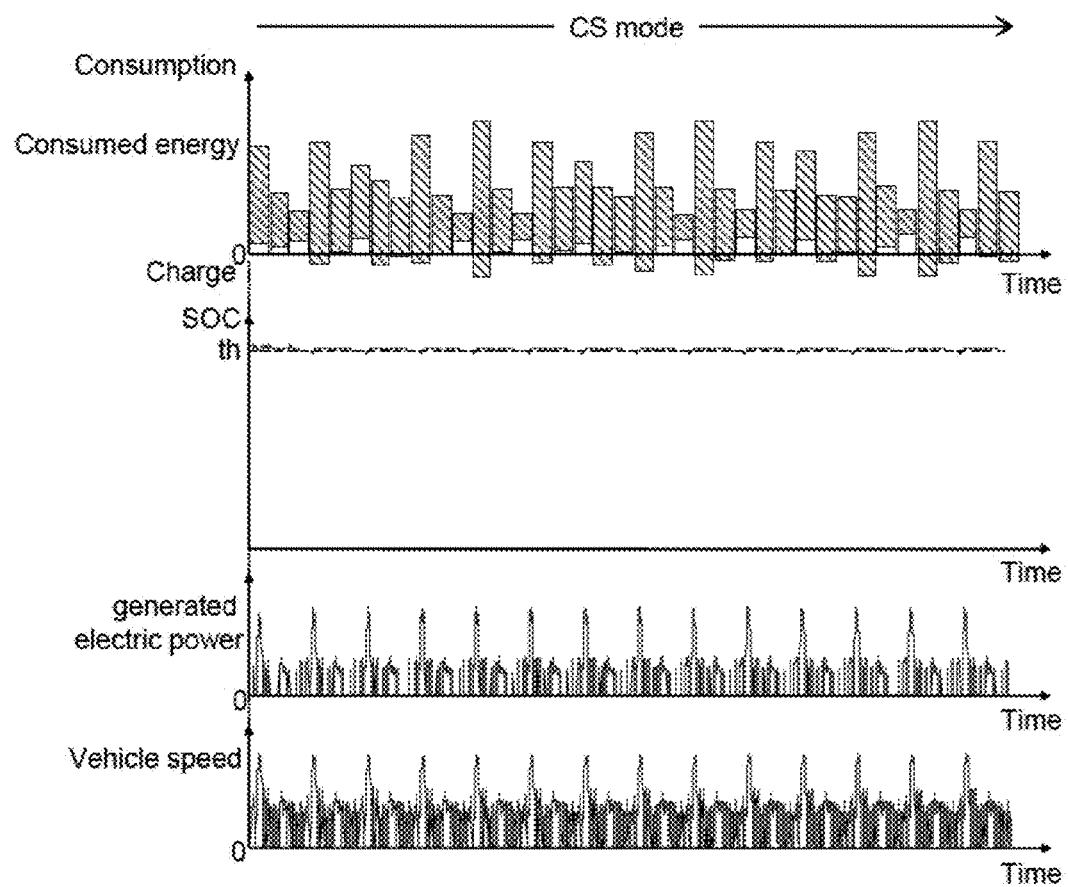
FIG. 20 shows graphs showing an example of changes with time of the consumed energy, the SOC of the battery, generated electric power by the generator and the vehicle speed as the PHEV is driven.

FIG. 18 is a graph showing a relationship between an output and efficiency of an APU 321 according to the operation of the internal combustion engine 309. An range shown as hatched in FIG. 18 is the "efficiency reduction range" and in this efficiency reduction range, the efficiency of the APU 321 reduces as the output thereof increases or gets higher. The efficiency reduction range utilization determination portion 461 sends information informing of the permission or prohibition of the operation of the internal combustion engine 309 in the efficiency reduction range (efficiency reduction range operation permitting or prohibiting information) to the generation amount setting portion 457.

The respective second threshold of the evaluation parameters which are used in the efficiency reduction range utilization determination portion 461 is a variable value corresponding to a difference between the actual SOC and the lower limit SOC of the battery 301 (the actual SOC–the lower limit SOC). In this embodiment, the second threshold set for the evaluation parameters is lower as the difference indicating the substantial available capacity of the battery 301 is smaller. The second threshold is higher than the first threshold described in the third embodiment.

A period of time over which the efficiency reduction range utilization determination portion 461 permits the operation of the internal combustion engine 309 in the efficiency reduction range (the predetermined period of time) is set longer as the differences between the evaluation parameters and the second threshold is greater and is set longer as the difference between the actual SOC and the lower limit SOC of the battery 301 is smaller. The efficiency reduction range utilization determination portion 461 sets a longest period of time out of three periods of time corresponding to the differences between the evaluation parameters and the second threshold and a period of the difference between the actual SOC and the lower limit SOC of the battery 301, as the predetermined period of time during which the internal combustion engine 309 is permitted to operate in the efficiency reduction range.

The generation amount setting portion 457 determines a unit generation amount as done by the generation amount determination portion 357 of the third embodiment in the event that APU operation permitting or prohibiting information sent from an APU operation determination portion 353 informs of the permission of the operation of the APU 321. However, in the event that the efficiency reduction range operation permitting or prohibiting information sent from the efficiency reduction range utilization determination portion 461 indicates the permission of the operation of the internal combustion engine 309 in the efficiency reduction range, the generation amount setting portion 457 determines a high unit generation amount. In a case an operation control portion 359 increases drastically the revolution speed of the internal combustion engine 309 according to the high unit generation amount, the NV performance of the vehicle reduces. Because of this, the generation amount setting portion 457 sets a target generation amount per unit time of the APU 321 (hereinafter, referred to as a "target unit generation amount") so that an actual generation amount of electric power generated per unit time by the APU 321 changes step by step towards the unit generation amount determined as described above.

The generation amount setting portion 457 sets a rate of change of the target unit generation amount higher as a maximum value of consumed energy indicated by the energy consumption parameter is higher. The generation amount determination portion 457 sets the rate of change of the target unit generation amount higher as a maximum value of an accumulated output of the battery 301 indicated by the NV evaluation parameter is higher. The generation amount setting portion 457 sets the rate of change of the target unit generation amount higher as a maximum value of an accumulated output of the battery 301 indicated by the APU efficiency permission parameter is higher. The generation amount setting portion 457 selects the highest change of rate out of the three rates of change. The generation amount setting portion 457 sets the selected rate of change as the rate of change of the target unit generation amount.

The generation amount setting portion 457 may additionally increase the rate of change of the target unit generation amount set as described above more as the difference between the actual SOC and the lower limit SOC of the battery 301 is smaller. Namely, the generation amount setting portion 457 multiplies the rate of change set as described above by a factor corresponding to the difference between the actual SOC and the lower limit SOC. The value of the factor is 1 or greater, and is higher as the difference between the actual SOC and the lower limit SOC is smaller. The generation amount setting portion 457 may additionally increase the rate of change of the target unit generation amount set as described above more as the actual SOC is smaller than the evaluation SOC. Namely, the generation amount setting portion 457 multiplies the rate of change set as described above by a factor corresponding to the difference between the evaluation SOC and the actual SOC. The value of the factor is 1 or greater, and is higher is the difference between the evaluation SOC and the actual SOC is greater.

In determining the unit generation amount, the generation amount setting portion 457 sets an upper limit of the unit generation amount so as to get higher as the maximum value of the consumed energy indicated by the energy consumption parameter is higher, as the maximum value of the accumulated output of the battery 301 indicated by the NV evaluation parameter is higher and as the maximum value of the accumulated output of the battery 301 indicated by the APU efficiency permission parameter is higher. The generation amount setting portion 457 selects the highest upper limit value out of the three upper limit values. The generation amount setting portion 457 sets the upper limit of the unit generation amount so selected.

The generation amount setting portion 457 may additionally increase the upper limit value of the unit generation amount set as described above more as the actual SOC is smaller than the evaluation SOC. Namely, the generation amount setting portion 457 multiplies the upper limit value set as described above by a factor corresponding to the difference between the evaluation SOC and the actual SOC. The value of the factor is 1 or greater, and is higher as the difference between the evaluation SOC and the actual SOC is greater. The generation amount setting portion 457 may additionally increase the upper limit of the unit generation amount set as described above more as the difference between the actual SOC and the lower limit SOC of the battery 301 is smaller. Namely, the generation amount setting portion 457 multiplies the upper limit value set as described above by a factor corresponding to the difference between the actual SOC and the lower limit SOC. The value of the factor is 1 or greater, and is higher as the difference between the actual SOC and the lower limit SOC is smaller.

Thus, as has been described heretofore, according to this embodiment, when the SOC of the battery 301 needs to be increased quickly as when the evaluation parameters are very high or as when the substantial available capacity of the battery 301 is small, the battery 301 can be charged by the high output of the APU 321 while holding the NV performance of the vehicle.

While the invention has been described in detail and by reference to the specific embodiments, it is obvious to those skilled in the art to which the invention pertains that various alterations or modifications can be made thereto without departing from the spirit and scope of the invention.

This patent application is based on the Japanese Patent Application (No. 2013-178273) filed on Aug. 29, 2013 and the Japanese Patent Application No. 2013-178274) filed on Aug. 29, 2013, the contents of which are incorporated herein by reference.

DESCRIPTION OF REFERENCE NUMERALS AND CHARACTERS

101 battery (BATT)
103 converter (CONV)
105 first inverter (first INV)
107 motor (Mot)
109 internal combustion engine (ENG)
111 generator (GEN)
113 second inverter (second INV)
115 gearbox
117 vehicle speed sensor
118 charger
119, 219 management ECU (MG ECU)
121 APU
123 drive shaft
125 plug
151 driving condition evaluation portion
153 APU operation determination portion
155 target SOC setting portion
157 generation amount determination portion
159 operation control portion
171 required output calculation portion
173 consumed energy calculation portion
175 energy consumption evaluation portion
177 NV permitting charging and discharging electric power calculation portion
179 NV permission evaluation portion
181 APU efficiency permitting charging and discharging electric power calculation portion
183 APU efficiency permission evaluation portion
257 generation amount setting portion
261 efficiency reduction range utilization determination portion
301 battery (BATT)
303 converter (CONV)

305 first inverter (first INV)
307 motor (Mot)
309 internal combustion engine (ENG)
311 generator (GEN)
313 second inverter (second INV)
315 gearbox
317 vehicle speed sensor
318 charger
319, 419 management ECU (MG ECU)
321 APU
323 drive shaft
325 plug
351 driving condition evaluation portion
353 APU operation determination portion
355 target SOC setting portion
357 generation amount determination portion
359 operation control portion
371 required output calculation portion
373 consumed energy calculation portion
375 energy consumption evaluation portion
377 NV permitting charging and discharging electric power calculation portion
379 NV permission evaluation portion
381 APU efficiency permitting charging and discharging electric power calculation portion
383 APU efficiency permission evaluation portion
457 generation amount setting portion
461 efficiency reduction range utilization determination portion

The invention claimed is:

1. A generation control apparatus for a hybrid vehicle including:
a rechargeable battery which supplies electric power to a motor which is a drive source of the hybrid vehicle,
a generating unit which has an internal combustion engine and a generator which generates electric power by operating the internal combustion engine to supply the generated electric power to the motor or the battery, and
the motor which is driven by the electric power supplied from at least one of the battery and the generating unit,
wherein the generation control apparatus comprises:
a driving condition evaluation portion for evaluating a driving condition of the hybrid vehicle from each of viewpoints of energy consumption at the motor, a noise vibration (NV) performance of the hybrid vehicle and generation efficiency of the generating unit; and
a generating operation determination portion for determining whether or not the operation of the generating unit is necessary based on an evaluation parameter of any one or more viewpoints obtained from the driving condition evaluation portion,
wherein the generating operation determination portion permits the operation of the generating unit when at least one of an energy consumption evaluation parameter which results from executing an evaluation from a viewpoint of the energy consumption at the motor, an NV evaluation parameter which results from executing an evaluation from a viewpoint of the NV performance of the hybrid vehicle and a generation efficiency evaluation parameter which results from executing an evaluation from a viewpoint of the generation efficiency of the generating unit exceeds a first threshold which is set for each evaluation parameter.

2. The generation control apparatus according to claim 1, wherein the first threshold is smaller as a substantial available capacity of the battery is smaller.

3. A generation control apparatus for a hybrid vehicle including:
a rechargeable battery which supplies electric power to a motor which is a drive source of the hybrid vehicle,
a generating unit which has an internal combustion engine and a generator which generates electric power by operating the internal combustion engine to supply the generated electric power to the motor or the battery, and
the motor which is driven by the electric power supplied from at least one of the battery and the generating unit,
wherein the generation control apparatus comprises:
a driving condition evaluation portion for evaluating a driving condition of the hybrid vehicle from each of viewpoints of energy consumption at the motor, a noise vibration (NV) performance of the hybrid vehicle and generation efficiency of the generating unit;
a generating operation determination portion for determining whether or not the operation of the generating unit is necessary based on an evaluation parameter of any one or more viewpoints obtained from the driving condition evaluation portion,
a charge target deriving portion for deriving a highest state of charge out of states of charge of the battery which is necessary for the motor to output energy or an output which is indicated by each evaluation parameter; and
an operation control portion for controlling the operation of the internal combustion engine so that a state of charge of the battery gets closer to the state of charge which is derived by the charge target deriving portion.

4. The generation control apparatus according to claim 3, wherein the charge target deriving portion sets a target charge state of the battery step by step towards the highest state of charge until the state of charge of the battery arrives at the highest state of charge, and
the operation control portion controls the operation of the internal combustion engine so that the state of charge of the battery becomes the target state of charge.

5. The generation control apparatus according to claim 4, wherein a time interval at which the charge target deriving portion sets the target charge state differs according to a time spent in controlling by the operation control portion.

6. The generation control apparatus according to claim 4, wherein a time interval at which the charge target deriving portion sets the target charge state differs according to a distance over which the hybrid vehicle travels when control of the operation control portion is performed.

7. The generation control apparatus according to claim 4, wherein a time interval at which the charge target deriving portion sets the target charge state differs according to a difference between an actual state of charge of the battery when control of the operation control portion is performed and the highest state of charge.

8. The generation control apparatus according claim 1, comprising:
an efficiency reduction range utilization determination portion for permitting the operation of the generating unit in an efficiency reduction range where the efficiency of the generating unit reduces as the output of the generating unit gets higher when at least one of an energy consumption evaluation parameter which results from executing an evaluation from a viewpoint of the energy consumption at the motor, an NV evaluation parameter which results from executing an evaluation from a viewpoint of the NV performance of the hybrid vehicle and a generation efficiency evaluation parameter which results from executing an evaluation from a viewpoint of the generation efficiency of the generating unit exceeds a second threshold which is set for each evaluation parameter or a substantial available capacity of the battery is less than a predetermined value.

9. The generation control apparatus according to claim 8, wherein the second threshold is smaller as a substantial available capacity of the battery is smaller.

10. The generation control apparatus according to claim 8, wherein the efficiency reduction range utilization determination portion permits the operation of the generating unit in the efficiency reduction range for a predetermined period of time.

11. The generation control apparatus according to claim 10,
wherein the predetermined period of time is set to be longer as a difference between each evaluation parameter and the second threshold is greater and set to be longer as the substantial available capacity of the battery is smaller, and
the efficiency reduction range utilization determination portion sets a longest period of time out of three periods of time according to the differences between each evaluation parameter and the second threshold and a period according to the substantial available capacity, as the predetermined period of time.

12. A generation control apparatus for a hybrid vehicle including:
a rechargeable battery which supplies electric power to a motor which is a drive source of the hybrid vehicle,
a generating unit which has an internal combustion engine and a generator which generates electric power by operating the internal combustion engine to supply the generated electric power to the motor or the battery, and
the motor which is driven by the electric power supplied from at least one of the battery and the generating unit,
wherein the generation control apparatus comprises:
a driving condition evaluation portion for evaluating a driving condition of the hybrid vehicle from each of viewpoints of energy consumption at the motor, a noise vibration (NV) performance of the hybrid vehicle and generation efficiency of the generating unit;
a generating operation determination portion for determining whether or not the operation of the generating unit is necessary based on an evaluation parameter of any one or more viewpoints obtained from the driving condition evaluation portion, and
a generation amount determination portion for determining a highest unit generation amount out of unit generation amounts calculated according to each evaluation parameter, as a generation amount per unit time of the generating unit.

13. The generation control apparatus according to claim 12,
wherein the generation amount determination portion increases additionally the determined unit generation amount as the substantial available capacity of the battery is smaller.

14. The generation control apparatus according to claim 12, comprising:
a charge target deriving portion for deriving a highest state of charge out of states of charge of the battery which is necessary for the motor to output energy or an output which is indicated by each evaluation parameter,
wherein the generation amount determination portion increases additionally the determined unit generation amount as an actual state of charge of the battery is smaller with respect to the highest state of charge of the battery which is derived by the charge target deriving portion.

15. The generation control apparatus according to claim 12, comprising:
an efficiency reduction range utilization determination portion for permitting the operation of the generating unit in an efficiency reduction range where the efficiency of the generating unit reduces as the output of the generating unit gets higher when at least one of an energy consumption evaluation parameter which results from executing an evaluation from a viewpoint of the energy consumption at the motor, an NV evaluation parameter which results from executing an evaluation from a viewpoint of the NV performance of the hybrid vehicle and a generation efficiency evaluation parameter which results from executing an evaluation from a viewpoint of the generation efficiency of the generating unit exceeds a second threshold which is set for each evaluation parameter or a substantial available capacity of the battery is less than a predetermined value,
wherein the generation amount determination portion sets a target unit generation amount as a target generation amount per unit time so that a generation amount per unit time of the generating unit changes step by step towards the determined unit generation amount in an event that the efficiency reduction ranger utilization determination portion permits the operation of the generating unit in the efficiency reduction range.

16. The generation control apparatus according to claim 15,
wherein the generation amount determination portion sets a rage of change of the target unit generation amount higher as an energy consumption evaluation parameter which results from executing an evaluation from the viewpoint of the energy consumption at the motor is higher, sets a rate of change of the target unit generation amount higher as an NV evaluation parameter which results from executing an evaluation from the viewpoint of the NV performance of the hybrid vehicle is higher and sets a rate of change of the target unit generation amount higher as a generation efficiency evaluation parameter which results from executing an evaluation from the viewpoint of the generation efficiency of the generating unit is higher, and selects a highest change of rate out of the three set rates of change to set the selected rate of change as a rate of change of the target unit generation amount.

17. The generation control apparatus according to claim 16,
wherein the generation amount determination portion increases additionally the set change of rate of the target unit generation amount as the substantial available capacity of the battery is smaller.

18. The generation control apparatus according to claim 16, comprising:
a charge target deriving portion for deriving a highest state of charge out of states of charge of the battery which is necessary for the motor to output energy or an output which is indicated by each evaluation parameter,
wherein the generation amount determination portion increases additionally the set rate of change of the target unit generation amount as an actual state of charge of the battery is smaller with respect to the highest state of charge of the battery which is derived by the charge target deriving portion.

19. The generation control apparatus according to claim 12, comprising:
an operation control portion for controlling the operation of the internal combustion engine so that the generating unit generates the unit generation amount determined by the generation amount determination portion or the target unit generation amount set by the generation amount determination portion.

* * * * *